(12) United States Patent
Iwamoto

(10) Patent No.: US 6,275,660 B1
(45) Date of Patent: Aug. 14, 2001

(54) MANUAL-WIND CAMERA

(75) Inventor: Shigeru Iwamoto, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/443,310

(22) Filed: Nov. 19, 1999

(30) Foreign Application Priority Data

Nov. 19, 1998 (JP) .................................................. 10-329743

(51) Int. Cl.⁷ .............................. G03B 1/00; G03B 17/00
(52) U.S. Cl. .................. 396/266; 396/403; 396/408; 396/536
(58) Field of Search ................................ 396/403, 406, 396/408, 409, 266, 503, 536, 404

(56) References Cited

U.S. PATENT DOCUMENTS 5,903,784 * 5/1999 Hori ...................................... 396/277
6,026,250 * 2/2000 Goto et al. ......................... 396/266 X
6,126,333 * 10/2000 Hori .................................. 396/403 X

FOREIGN PATENT DOCUMENTS 10-20375    1/1998  (JP) .
19728982    1/1998  (DE) .

* cited by examiner

Primary Examiner—W. B. Perkey
(74) Attorney, Agent, or Firm—Greenblum & Bernstein, P.L.C.

(57) ABSTRACT

A manual-wind camera having a wind lever in which a film having no sprocket holes is loaded, the film being wound on a take-up spool, frame by frame, by manually operating the wind lever, includes a pulse generator which generates pulses in accordance with movement of the film wound by the wind lever; a rear-cover state detector which detects whether a rear cover of the camera is open or closed; and a control device. The control device determines whether the film is loaded into the camera in accordance with pulses generated by the control device when the wind lever is fully turned from an initial operational position to a maximum operational position thereof.

15 Claims, 17 Drawing Sheets

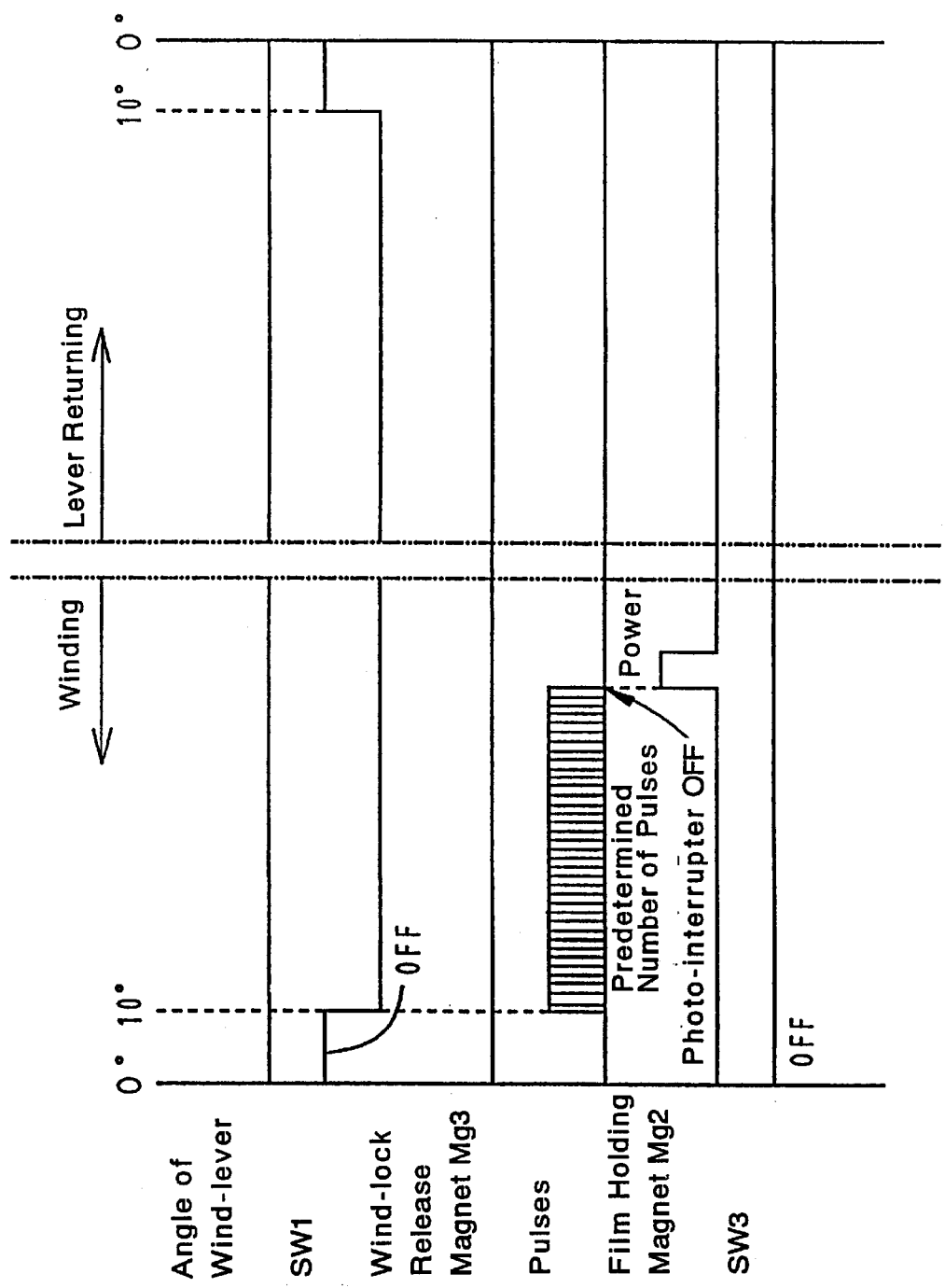

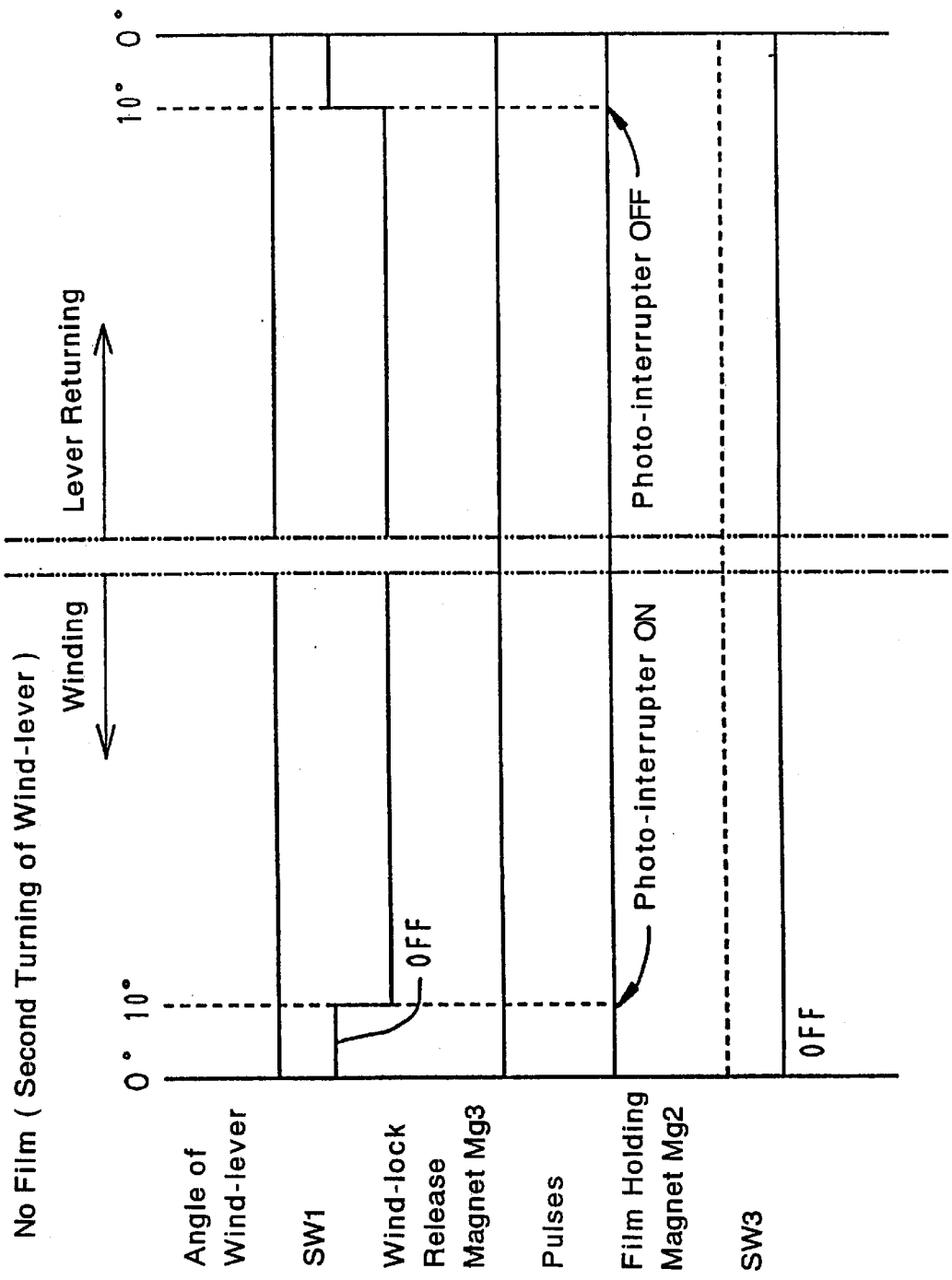

MANUAL-WIND CAMERA

BACKGROUND OF THE INVENTION

1. Field of the Invention

The present invention relates to a manual-wind camera provided with a wind lever which is manually operated to wind the film frame by frame.

2. Description of the Related Art

Manual-wind cameras using roll-film bearing no sprocket holes such as Brownie film (e.g., 120 or 220 format film) and having a film winding mechanism provided with a wind lever (i.e., thumb-operated lever) which is manually operated to wind the film frame by frame are known.

In this type of manual-wind camera, the following operations are performed by the user when a roll-film is loaded in the camera: firstly a roll-film is placed in the film chamber with the rear cover open; secondly the film end is placed on the take-up spool; thirdly the wind lever is turned several times to wind the film on the take-up spool until mark (start mark) printed on the backing paper of the film reaches the reference marking formed on the camera body; fourthly the rear cover is closed; and lastly the wind lever is turned a predetermined number of times to position the first frame over the photographic aperture.

Such conventional manual-wind cameras require a dummy roll-film to be loaded when performing a shutter test in which the shutter is released without exposing an image onto film. In this case, firstly the dummy film is placed in the film chamber with the rear cover open, secondly the rear cover is closed, and thirdly the wind lever is turned before the shutter is released by depressing the release button. Other cameras of this type are provided with a mechanism which makes it possible to perform the shutter test without using the dummy film. In this case, the shutter test is performed after a predetermined operation is performed.

However, in the former case, it is necessary to use a dummy film each time the shutter test is performed, which is troublesome. In the latter case, a predetermined operation needs to be performed each time the shutter test is performed, which is also troublesome.

Hence, it is preferable that the shutter test can be performed without the dummy film loaded in the camera. In such a case, it is preferable that the camera automatically determines whether the film has been loaded.

SUMMARY OF THE INVENTION

The primary object of the present invention is to provide a manual-wind camera using a roll-film having no sprocket holes, wherein the camera can determine with software whether film has been loaded, without providing the camera with any mechanical film detector used solely for determining whether film has been loaded.

To achieve the object mentioned above, according to an aspect of the present invention, there is provided a manual-wind camera having a wind lever in which a film having no sprocket holes is loaded, the film being wound on a take-up spool, frame by frame, by manually operating the wind lever, the camera including a pulse generator which generates pulses in accordance with movement of the film wound by the wind lever; a rear-cover state detector which detects whether a rear cover of the camera is open or closed; and a control device. The control device determines whether the film is loaded into the camera in accordance with pulses generated by the pulse generator when the wind lever is fully turned from an initial operational position to a maximum operational position thereof.

Preferably, a shutter of the camera is permitted to be released without the take-up spool being locked.

Preferably, the control device prohibits the pulse generator from generating the pulses if the control device determines that the film is not in the camera.

Preferably, the control device prohibits a shutter of the camera from being released until a first frame of the film is positioned over the photographic aperture while allowing the wind lever to continue being turned to wind the film until the first frame of the film is positioned over the photographic aperture.

Preferably, the control device does not detect whether the film is in the camera when the wind lever is operated for the first time after the rear cover is closed.

Preferably, the control device prohibits the shutter of the camera from being released when the rear cover is open, while allowing the wind lever to be rotated.

Preferably, the control device allows the shutter of the camera to be released if the control device detects that no film is loaded into the camera.

According to another aspect of the present invention, a manual-wind camera having a wind lever is provided, a film being wound by manually turning the wind lever from an initial operational position to a maximum operational position thereof, the camera including a pulse generator which generates pulses in accordance with movement of the film wound by the wind lever; a rear-cover state detector which detects whether a rear cover of the camera is open or closed; and a control device. The control device detects the pulses generated by the pulse generator; and the control device determines whether the film is loaded into the camera in accordance with pulses detected by the control device when the wind lever is fully turned from the initial operational position to the maximum operational position after the rear-cover state detector detects that the rear cover is closed.

Preferably, a take-up spool is further included on which the film is wound when the wind lever is turned in a direction from the initial operational position to the maximum operational position; and an electromagnetic clutch, which connects the take-up spool with the wind lever when power via the frictional connection of the electromagnetic clutch, is not supplied to the electromagnetic clutch; wherein the electromagnetic clutch disconnects the take-up spool from the wind lever when power is supplied to the electromagnetic clutch.

Preferably, a film holding device is further included which prohibits the take-up spool from rotating to thereby prohibit the film from being wound on the take-up spool only when power is supplied to the film holding device.

Preferably, the control device supplies power to the electromagnetic to disconnect the take-up spool from the wind lever and at the same time supplies power to the film holding device to prohibit the film from being wound on the take-up spool when a counter value of the counter reaches a predetermined value.

According to another aspect of the present invention, a manual-wind camera is provided having a wind lever in which a film having no sprocket holes is loaded, the film being wound on a take-up spool, frame by frame, by manually operating the wind lever. The camera includes: a pulse generator which generates pulses in accordance with movement of the film wound by the wind lever; a rear-cover state detector which detects whether a rear cover of the camera is open or closed; and a control device. Upon the rear cover being closed, the control device judges whether the film is loaded into the camera in accordance with pulses generated by the control device when the wind lever is fully rotated from an initial operational position to a maximum operational position.

Preferably, upon the rear cover being closed, the control device judges whether the film is loaded into the camera according to pulses generated after pulses generated after the wind lever is initially rotated to the maximum operational position.

According to another aspect of the present invention, a manual-wind camera is provided having a wind lever in which a film having no sprocket holes is loaded, the film being wound on a take-up spool, frame by frame, by manually operating the wind lever. The camera includes a pulse generator which generates pulses in accordance with movement of the film wound by the wind lever; a rear-cover state detector which detects whether a rear cover of the camera is open or closed; and a control device. Upon the rear cover being closed, the control device judges whether the film is loaded into the camera when the wind lever has been fully rotated to a maximum operational position a second time.

Preferably, the film is Brownie film.

The present disclosure relates to subject matter contained in Japanese Patent Application No. 10-329743 (filed on Nov. 19, 1998) which is expressly incorporated herein by reference in its entirety.

BRIEF DESCRIPTION OF THE DRAWINGS

The present invention will be described below in detail with reference to the accompanying drawings in which:

FIG. 13B is a chart for illustrating the sequence of the film indexing process in the case where film is loaded in the camera, showing a state where pulses are generated by the last winding operation of the wind lever to position the first frame over the photographic aperture;

FIG. 14B is a chart for illustrating the sequence of the film indexing process in the case where no film is loaded in the camera, showing a state where pulses are generated by the second winding operation of the wind lever.

DESCRIPTION OF THE PREFERRED EMBODIMENT

Figure 1:
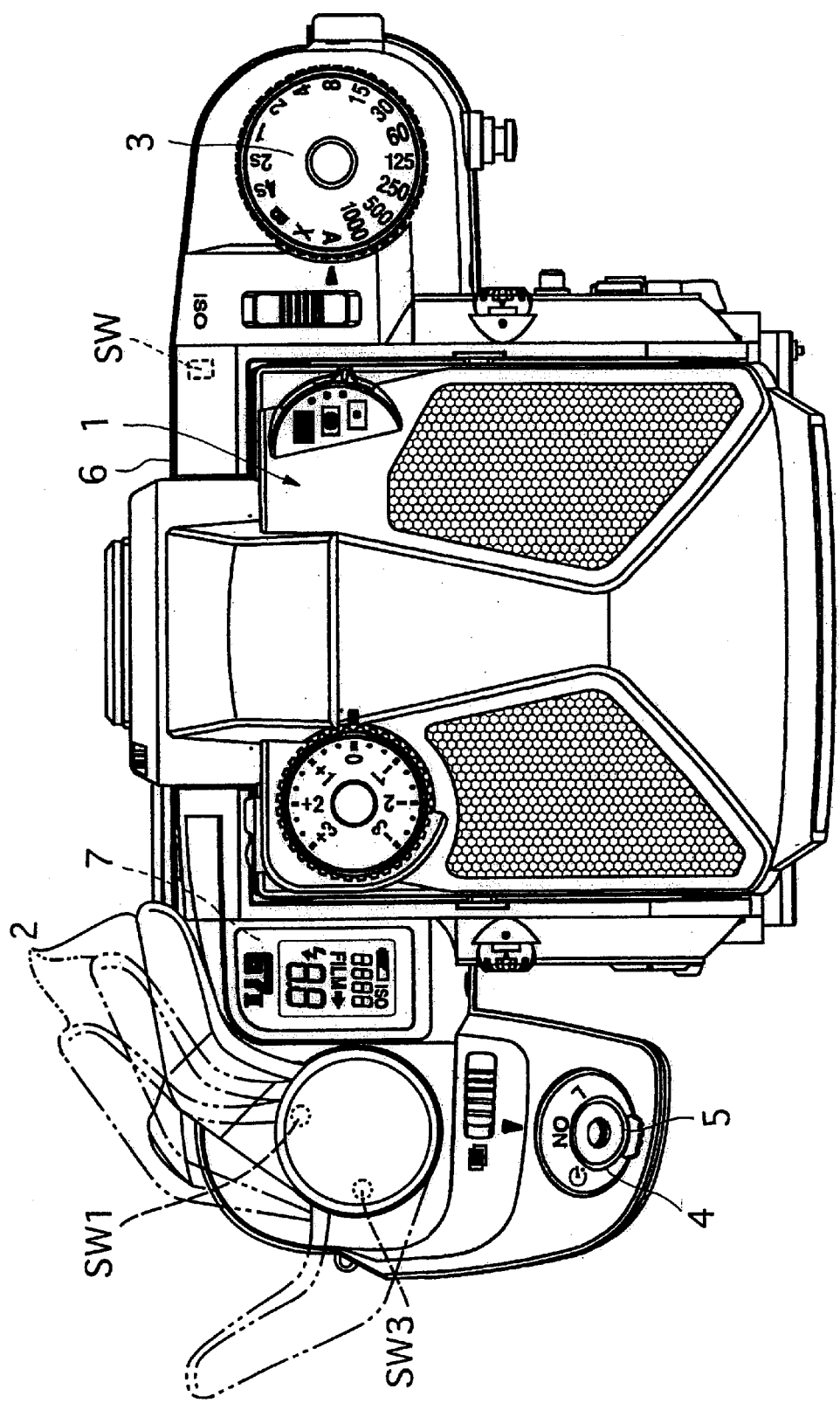
FIG. 1 is a plan view of an embodiment of a manual-wind camera to which the present invention is applied.

FIG. 1 shows an embodiment of a manual-wind camera to which the present invention is applied. Camera body 1 of the camera is provided thereon with a wind lever 2, a shutter-speed select dial 3, a shutter release button 4, a main switch 5 and an external LCD panel 7. The camera is provided at the back of the camera body 1 with an openable rear cover 6.

The camera body 1 is provided therein with a switch SW as a rear-cover state detector for detecting whether the rear cover 6 is open or closed. The wind lever 2 can be turned by 180 degrees at maximum from the initial rotational position (fully retreated position) thereof shown by a solid line in FIG. 1. The camera body 1 is provided therein under the wind lever 2 with a switch SW1. The switch SW1 remains OFF when the wind lever 2 is positioned at the initial rotational position thereof and remains OFF while the wind lever 2 is rotated from the initial rotational position thereof (i.e., the rotational position of zero degrees) by an angle θ of rotation of less than 10 degrees (0°≦θ<10°). When the wind lever 2 is positioned in an accommodated position thereof, the wind lever 2 is positioned at any rotational position within an angle of rotation of less than 10 degrees (0°≦θ<10°). The switch SW1 is turned ON when the wind lever 2 is rotated from the initial rotational position thereof by an angle of rotation from 10 to 180 degrees (10°≦θ≦180°). The camera body 1 is further provided therein under the wind lever 2 with another switch SW3 which is turned ON at the moment the trailing curtain of the shutter (not shown) starts moving and is turned OFF upon a completion of a shutter charge.

Figure 2:
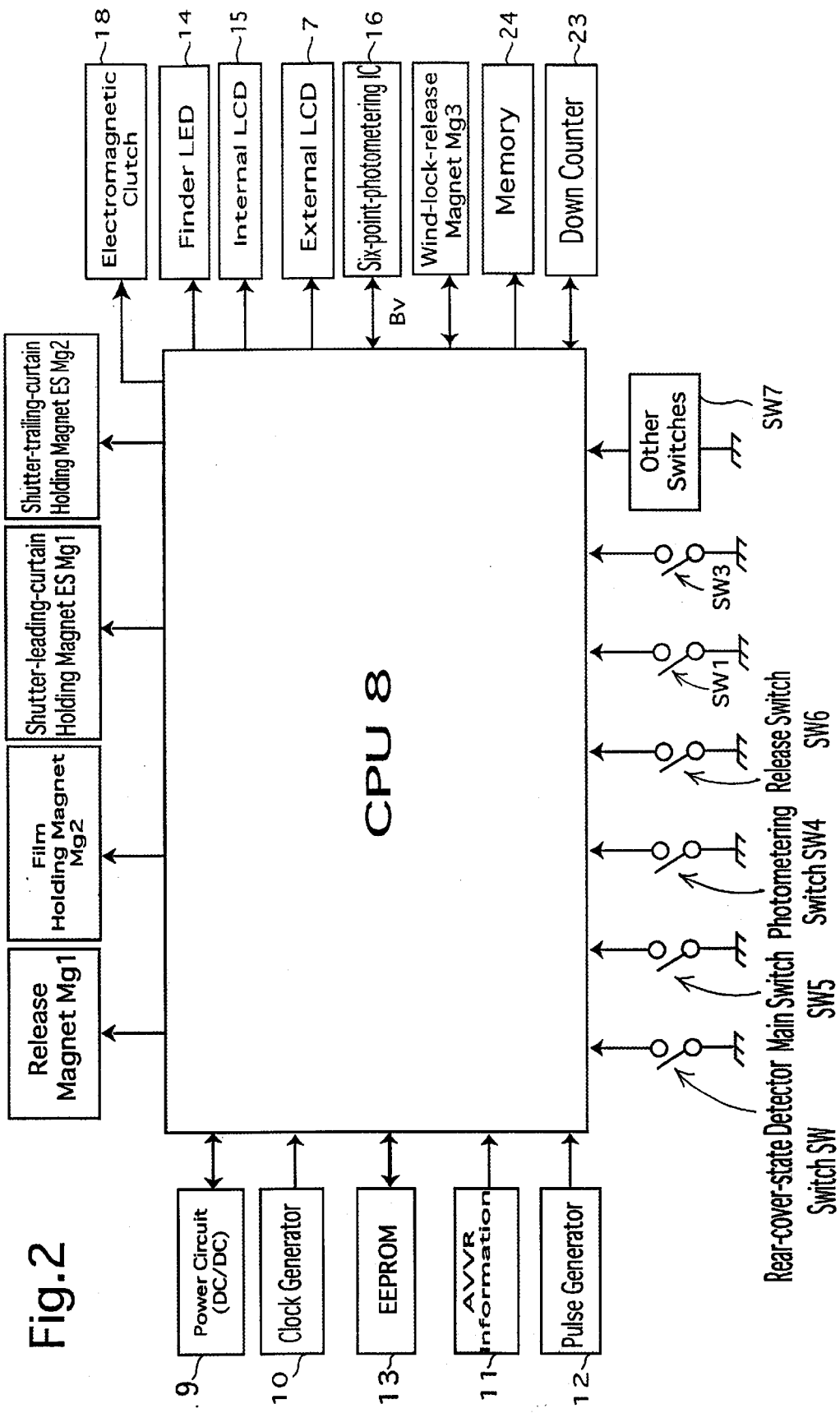
FIG. 2 is a block diagram of a control circuit provided in the manual-wind camera shown in FIG. 1.
Figure 3:
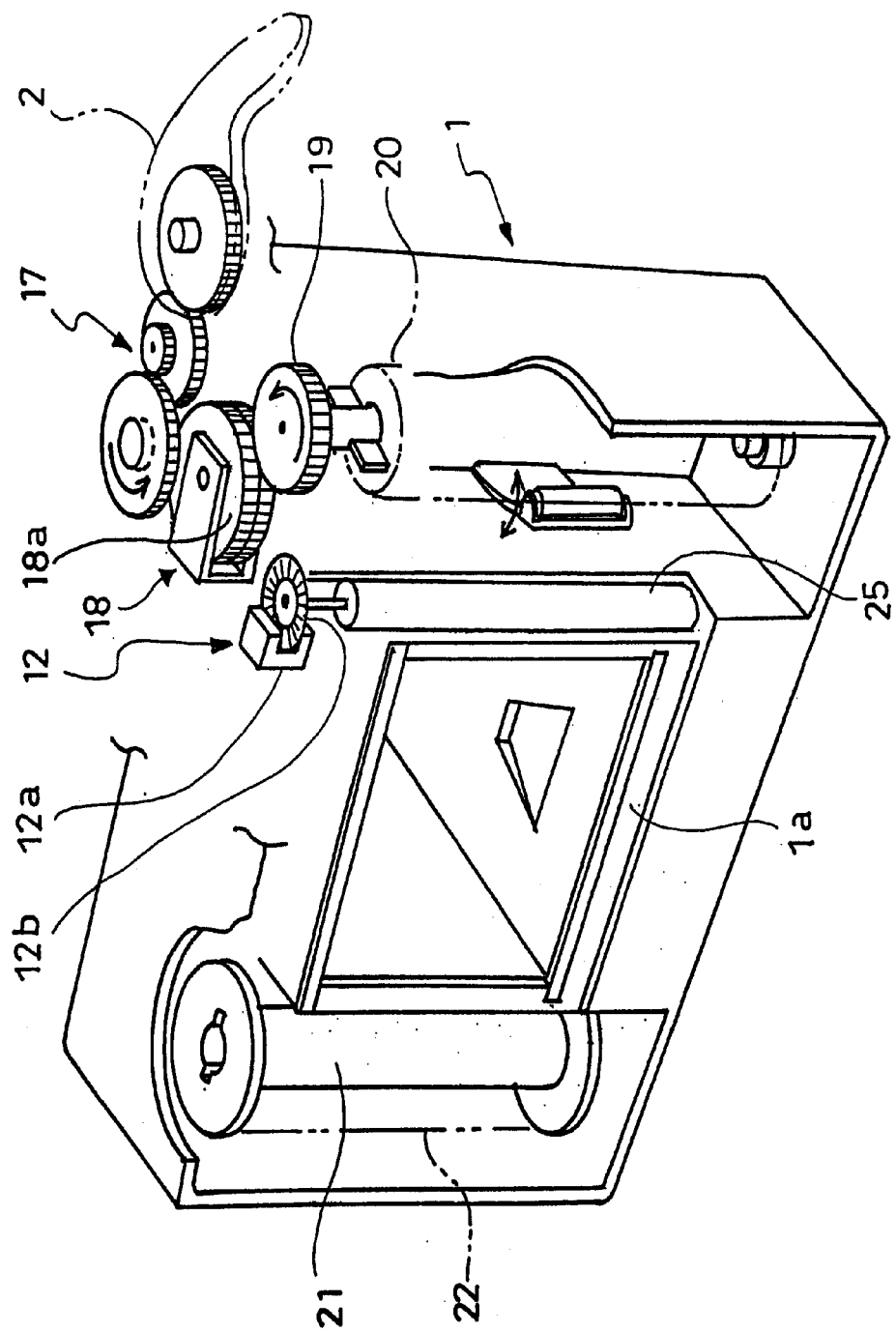
FIG. 3 is a schematic perspective view of part of the manual-wind camera shown in FIG. 1, showing the film winding mechanism thereof.

The camera is provided in the camera body 1 with a CPU (control device) 8 (see FIG. 2). Power circuit 9 supplies power to the CPU 8. Clock generator 10 supplies clock signals as reference signals for controlling the overall operations of the camera to the CPU 8. Aperture value information is supplied to the CPU 8 from a photographic lens (not shown) via a diaphragm conjoint member 11 which is associated with the diaphragm (not shown) of the photographic lens. Pulse generator 12 supplies pulses to the CPU 8. All the photographic data stored in the EEPROM 13 are input into the CPU 8. The pulse generator 12 is composed of a photo-interrupter 12a and an associated rotary disc 12b having a plurality of radial slits as shown in FIG. 3. The rotary disc 12b is coaxially secured to the upper end of a film guide roller 25 positioned between the photographic aperture and the spool chamber as shown in FIG. 3. The film guide roller 25, which has a rubber surface, is in press-contact with the film 22 upon the rear cover 6 being closed, so that the film guide roller 25 rotates in accordance with the winding of the film 22.

Various switch information such as those output from the main switch 5, the rear-cover-state detector switch SW, the switch SW1, the switch SW3, a photometering switch SW4 which is turned ON by operating the release button 4, a release switch SW6 and other switches SW7 are input into the CPU 8. The photometering switch SW4 and the release switch SW6 are turned ON when the release button 4 is half and fully depressed, respectively.

The camera is provided with an internal LCD panel 15 positioned in the viewfinder of the camera, an LED 14 which illuminates the internal LCD panel 15, the external LCD panel 7, a release magnet Mg1, a film holding magnet (film holding device) Mg2, a shutter-leading-curtain holding magnet ESMg1, a shutter-trailing-curtain holding magnet ESMg2, a wind-lock release magnet Mg3 and a six-point photometering IC 16 which are all electrically connected to the CPU 8. The CPU 8 performs various operations of the camera in accordance with the control programs represented by flow charts which will be discussed later. In accordance with the state of operation of the camera, the CPU 8 outputs a lighting signal to the LED 14 to turn the LED 14 ON, information to the internal LCD 15 which is to be displayed thereon, and information to the external LCD 7 which is to be displayed thereon. Moreover, in accordance with the state of operation of the camera, the CPU 8 outputs control signals or information to the release magnet Mg1, the film holding magnet Mg2, the shutter-leading-curtain holding magnet ESMg1, the shutter-trailing-curtain holding magnet ESMg2, the wind-lock release magnet Mg3 and the six-point photometering IC 16. Furthermore, in accordance with the state of operation of the camera, the CPU 8 controls the six-point photometering IC 16 and inputs photometering information from the six-point photometering IC 16.

The camera is further provided with an electromagnetic clutch 18, a memory 24 and a down counter 23 which are all electrically connected to the CPU 8. As shown in FIG. 3 the wind lever 2 is connected with the take-up spool 20 via a gear-ratchet mechanism 17, an electromagnetic clutch gear 18a of the electromagnetic clutch 18 and a gear 19 coaxially secured to the upper end of the take-up spool 20. Roll-film 22 (shown by two-dot chain line in FIG. 3) is initially wound on a spool 21 positioned in the film chamber of the camera. The take-up spool 20 is positioned in the spool chamber of the camera. Between the film chamber and the spool chamber there is provided a rectangular photographic aperture (e.g., a picture format) which defines the limits of each frame exposed. Film is drawn out to extend over the photographic aperture so that the film end is engaged with the take-up spool 20. Turning the wind lever 2 counterclockwise as viewed in FIG. 3 causes each of the gears of the gear-ratchet mechanism 17, the electromagnetic clutch gear 18a and the gear 19 to rotate so that the film 22 is wound onto the take-up spool 20. The CPU 8 exchanges information with each of the down counter 23 and the memory 24. The film holding magnet Mg2 stops the rotation of the take-up spool 20 via the gear 19 when power is supplied to the film holding magnet Mg2 to hold the position of the film. The wind-lock release magnet Mg3 allows the wind. lever 2 to be turned beyond the accommodated position when power is supplied to the wind-lock release magnet Mg3.

Winding the film 22 on the take-up spool 20 causes the film guide roller 25 which contacts the film 22 to rotate and at the same time causes the pulse generator 12, which is associated with the film guide roller 25, to generate pulses. Fundamental operations of the camera will be hereinafter discussed with reference to the flow charts shown in FIGS. 4 through 12. All the operations are controlled by the CPU 8. For the purpose of illustration, firstly the operations of the camera with the rear cover 6 open and with the film 22 loaded in the camera body 1 will be discussed.

Figure 4:
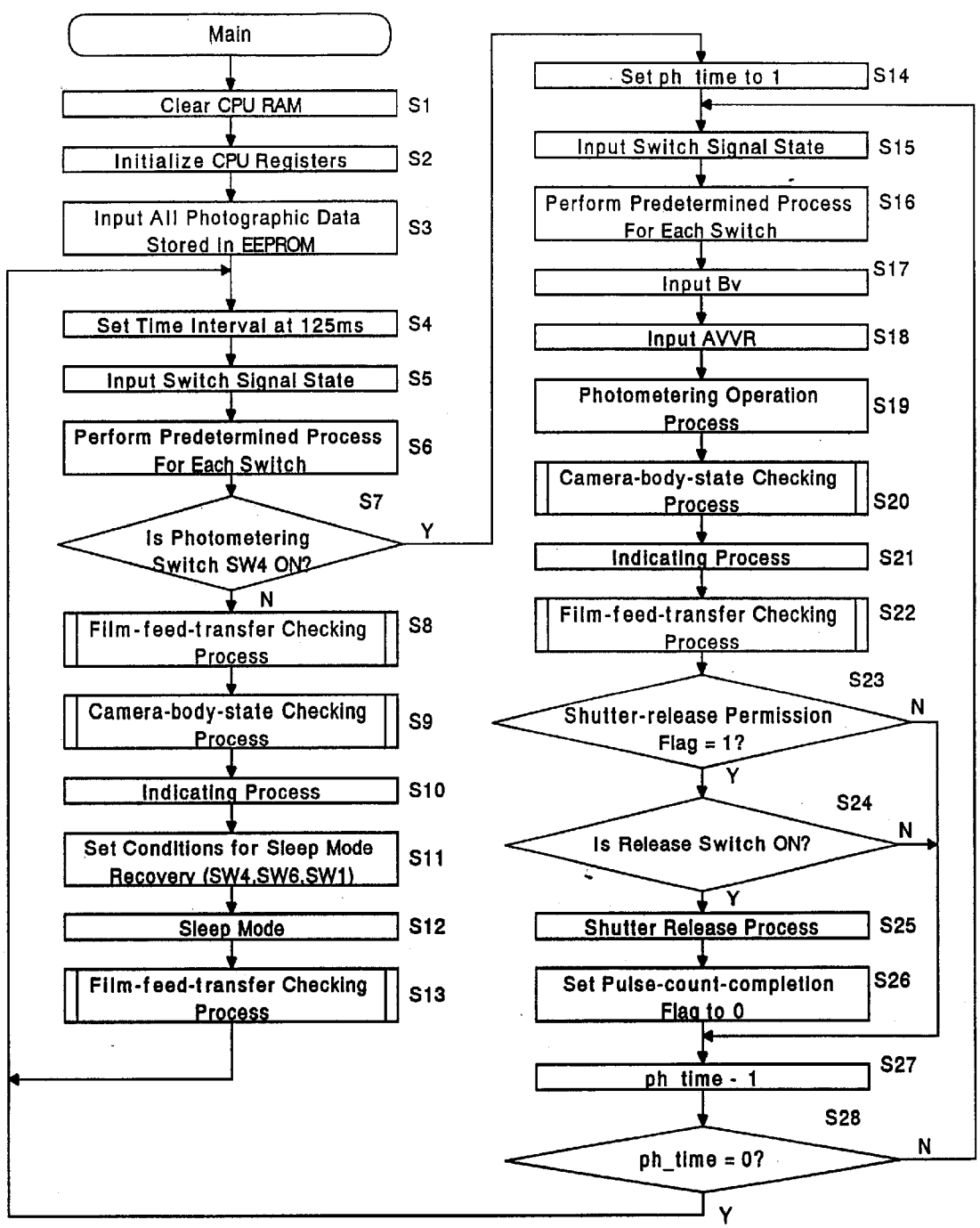
FIG. 4 is a flow chart which illustrates the main process of the manual-wind camera shown in FIG. 1.

Upon the main switch 5 being turned ON, control enters the main process shown in FIG. 4. In the main process, firstly the internal RAM provided in the CPU 8 is set to 0 (Step 1). Subsequently all registers provided in the CPU 8 are initialized (Step 2); all the photographic data stored in the EEPROM 13 is input into the CPU 8 (Step 3); the time interval as an interval between the commencement of the main process and the subsequent commencement of the main process is set to 125 ms (Step 4); the state of signal output front, each of the switches SW, SW1, SW3 through SW7 is input into the CPU 8 (Step 5), and for each of the switches SW, SW1, SW3 through SW7 a predetermined process corresponding to the state of the switch is performed (step 6).

Subsequently it is determined whether the photometering switch SW4 is ON (Step 7). If the photometering switch SW4 is OFF, control proceeds to Step 8 to perform the film-feed-transfer checking process.

In the film-feed-transfer checking process, the setting of the camera is checked to perform the film-feed-transfer process (step 107) in accordance with the setting of the camera in the case where the wind lever 2 is operated during the time the main process shown in FIG. 4 is performed.

Figure 7:
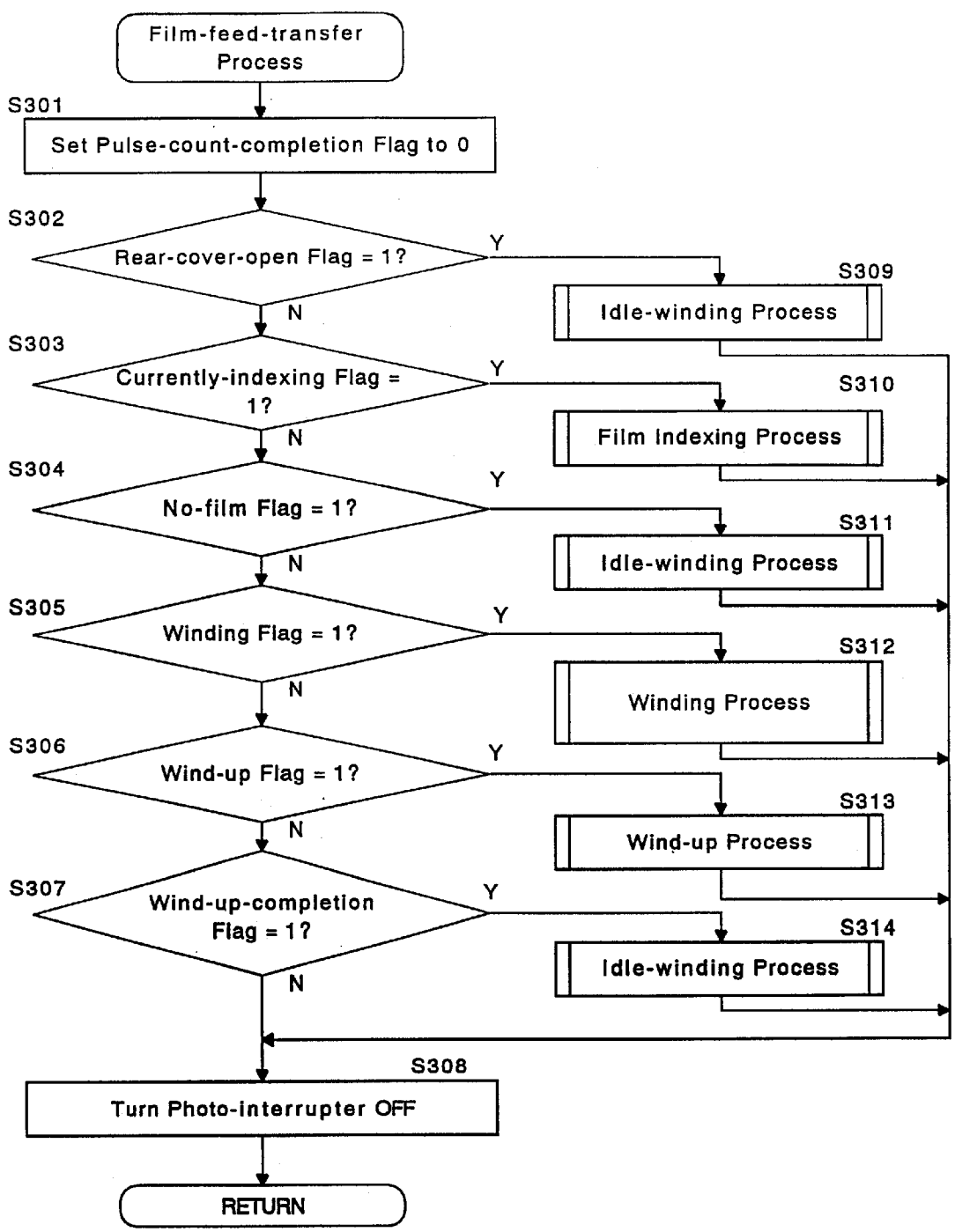
FIG. 7 is a flow chart which illustrates the film-feed-transfer process of the manual-wind camera shown in FIG. 1.

As shown in FIG. 7, the film-feed-transfer process (Step 107) includes the following processes: the idle-winding process (shown in FIG. 8) which is performed at Step 309 through which the film is wound onto the take-up spool 20 in a state where the roll film is positioned in the film chamber with the rear cover 6 being open until the marking which is printed on the backing paper (not shown) of the film 22, to indicate the position from which pictures can be taken, reaches a predetermined reference marking (not shown) formed on a rectangular aperture frame 1a; the film indexing process (Step 310) wherein the start of the film is wound to position the first frame over the photographic aperture after the rear cover 6 is closed; the winding process (step 312) through which the film is wound by one frame each time a picture is taken; the wind-up process (Step 313) through which the film is wound onto the spool 21 after a predetermined number of frames have all been exposed; the idle-winding process performed at Step 314 after the wind-up process is performed; the idle-winding process performed at Step 309 which makes it possible to rotate the take-up spool 20 without roll-film loaded in the camera in a state where the rear cover 6 is open; and the idle-winding process performed at Step 311 which makes it possible to rotate the take-up spool 20 without roll-film loaded in the camera in a state where the rear cover 6 is closed.

These processes performed in different cases will be hereinafter discussed in order:

Case No. 1: The roll film 22 is firstly placed in the film chamber with the rear cover 6 open, secondly the film end is placed on the take-up spool 20, and thirdly the film is wound onto the take-up spool 20 until the marking which is printed on the backing paper (not shown) of the film 22 to indicate the position from which pictures can be taken reaches the aforementioned predetermined reference marking (not shown) formed on the aperture frame 1a.

For the purpose of illustration it is herein assumed that the wind lever 2 is positioned in the accommodated position thereof while the switch SW3 is initially ON. That is, the camera is in a state where the shutter has been released but the shutter has not yet been charged.

Figure 5:
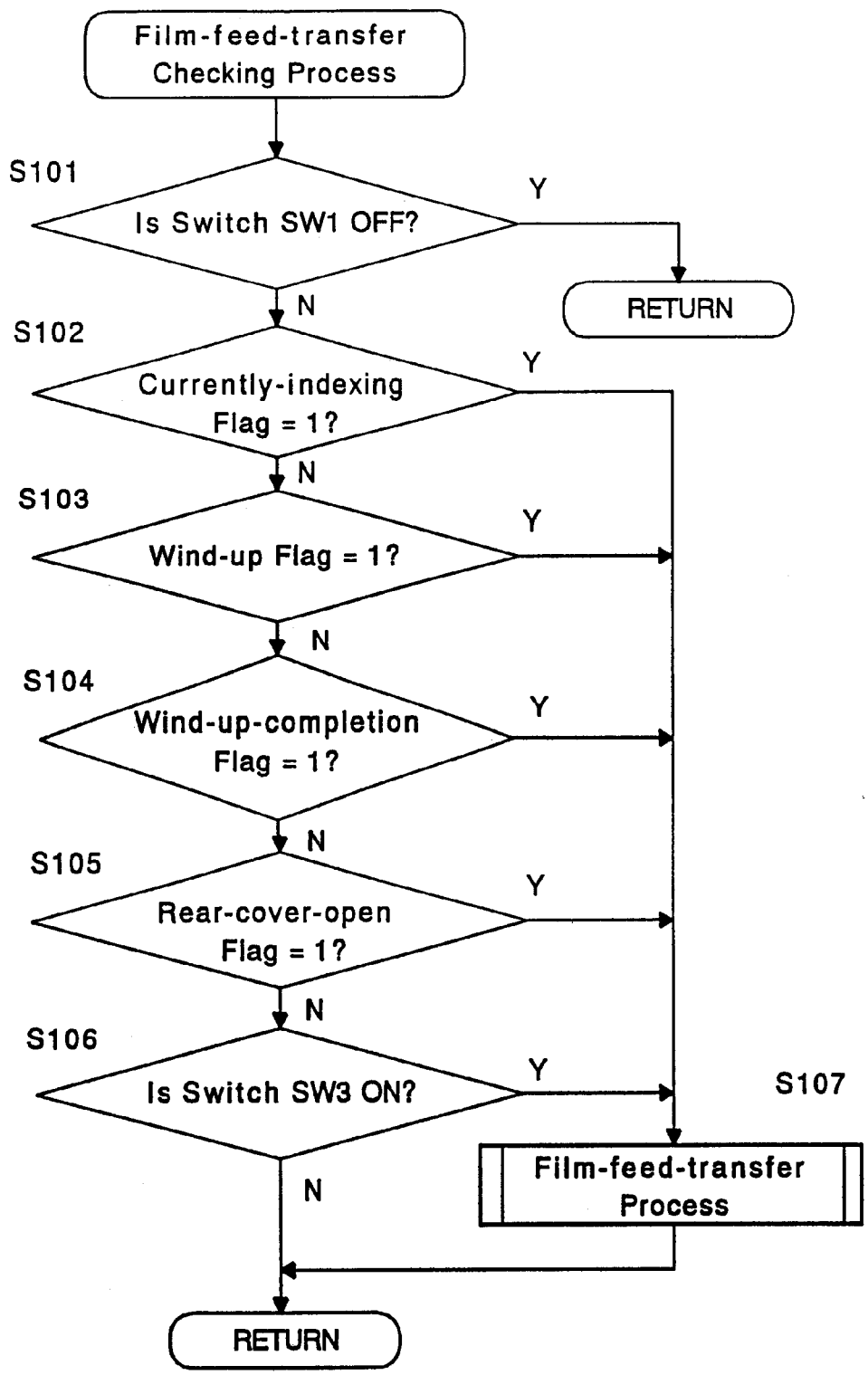
FIG. 5 is a flow chart which illustrates the film-feed-transfer checking process of the manual-wind camera shown in FIG. 1.

In the film-feed-transfer checking process at Step 8, as shown in FIG. 5, firstly it is determined whether the switch SW1 is OFF (Step 101). If the wind lever 2 is positioned in the accommodated position thereof, the switch SW1 is OFF, so that control returns to the main process to perform the camera-body-state checking process at Step 9. The details of the camera-body-state checking process at Step 9 will be discussed later. The details of film-feed-transfer checking process will be hereinafter discussed with reference to FIG. 5.

If the wind lever 2 is operated to thereby turn the switch SW1 ON at Step 101, control proceeds to Step 102 wherein it is determined whether a currently-indexing flag is 1. If it is determined at Step 102 that the currently-indexing flag is not 1, control proceeds to Step 103 wherein it is determined whether a wind-up flag is 1. If it is determined at Step 103 that the wind-up flag is not 1, control proceeds to Step 104 wherein it is determined whether a wind-up-completion flag is 1. If it is determined at Step 104 that the wind-up-completion flag is not 1, control proceeds to Step 105 wherein it is determined whether the rear-cover-open flag is 1. If it is determined at Step 105 that the rear-cover-open flag is not 1, control proceeds to Step 106 wherein it is determined whether the switch SW3 is ON. If it is determined at Step 106 that the switch SW3 is not ON, control returns to the main process to enter the camera-body-state checking process at Step 9. If the flag at each of Steps 102 through 105 is 1, control enters the film-feed-transfer process at Step 107 and subsequently returns to the main process to enter the camera-body-state checking process at Step 9. Likewise, at Step 106 if the switch SW3 is ON, control enters the film-feed-transfer process at Step 107 and subsequently returns to the main process to enter the camera-body-state checking process at Step 9.

In the camera-body-state checking process, it is determined what state the camera is currently in. The details of the camera-body-state checking process will be hereinafter discussed with reference to FIGS. 6A and 6B.

In the camera-body-state checking process, firstly it is determined whether the rear-cover-state detector switch SW is OFF, i.e., whether the rear cover 6 is open (Step 201). It, is herein detected that the rear cover 6 is open, so that, control proceeds to Step 202 wherein the film counter is set to 0, namely, portion on the external LCD 7 which indicates the frame number is made blank.

Subsequently, all the body-state-indicating flags are set to 0 (Step 203). The rear-cover-open flag, the currently-indexing flag, the wind-up flag, the wind-up-completion flag, a no-film flag, a winding flag and a currently-winding-film flag are referred to as body-state-indicating flags.

Subsequently the rear-cover-open flag is set to 1 (Step 204), a pulse-count-completion flag and a lever-turned flag are each set to 0 (Steps 205 and 206).

Subsequently it is determined whether the current frame is the last frame (Step 210). If it is determined that the current frame is not the last frame, control proceeds to Step 214 wherein it is determined whether the switch SW1 is OFF. When the wind lever 2 is positioned in the accommodated position thereof, it is determined at Step 214 that the switch SW1 is OFF, so that control proceeds to Step 215 wherein it is determined whether the switch SW1 was previously determined OFF.

If it is determined at Step 215 that the switch SW1 was previously determined OFF, control skips Step 216 to proceed to Step 217 wherein the pulse-count completion flag is set to 0. If it is determined at Step 215 that the switch SW1 was previously determined ON, control proceeds to Step 216 wherein a wind-lock-release permission flag is set to 1 in order to release the wind lock (i.e., winding operation is enabled), judging that the wind lever 2 has been operated. Subsequently control proceeds to Step 217 wherein the pulse-count-completion flag is set to 0.

In the case where it is determined at Step 214 that the switch SW1 is ON, control skips Steps 215, 216 and 217 and enters Step 218.

It is determined at Step 218 whether the switch SW3 is ON. In the case where it is determined that the switch SW3 is ON, control proceeds to Step 219 wherein it is determined whether the switch SW3 was previously determined ON. If it is determined at Step 218 that the switch SW3 is OFF, control proceeds to Step 221 wherein it is determined whether the switch SW3 is ON.

Turning the wind lever 2 to the maximum rotational position thereof, the wind lever 2 abuts against a stopper (not shown) formed on the camera body 1. The shutter charging operation of the camera completes when the wind lever 2 is fully turned from the accommodated position thereof (initial rotational position) to the maximum rotational position thereof.

The switch SW3 is OFF in a state of completion of the shutter charge and is ON in a state other than the state of completion of the shutter charge. Accordingly, the switch SW3 is turned OFF at the moment the wind lever 2 reaches the maximum rotational position since the shutter charge completes upon the wind lever 2 abuts against the stopper. Namely, that when the switch SW3 is OFF, the wind lever 2 has been turned to reach the maximum rotational position. The CPU 8 determines whether the wind lever 2 has been turned to reach the maximum rotational position, in accordance with the ON/OFF state of each of the switches SW1 and SW3.

If it is determined at Step 219 that the switch SW3 was previously determined OFF, control proceeds to Step 220 wherein the wind-lock-release permission flag is set to 1 and subsequently proceeds to Step 221. If it is determined at Step 219 that the switch SW3 was previously determined ON, control skips Step 220 to proceed to Step 221.

The route from Step 218 to S221 corresponds to a state before the shutter release process is performed. The route from Step 218 to Step 221 via Step 219 corresponds to a state before the film is wound after the shutter release process is performed. The route from Step 218 to Step 221 via Steps S219 and S220 corresponds to a state immediately after the shutter release process is performed since the switch SW3 is currently ON and previously OFF, in order to make it possible to wind the film by releasing the wind lock.

It is determined at Step 221 whether the switch SW3 is ON. If it is determined at Step 221 that the switch SW3 is not ON, control proceeds to Step 222 wherein it is determined whether the switch SW1 is OFF. If it is determined at Step 222 that the switch SW1 is OFF, control proceeds to Step 223 wherein a shutter-release permission flag is set to 1 and subsequently proceeds to Step 224. If it is determined at Step 221 that the switch SW3 is ON, control skips Steps 222 and 223 to proceed to Step 224. It it is determined at Step 222 that the switch SW1 is not OFF, control skips Step 223 to proceed to Step 224.

The route from Step 221 to S224 corresponds to a state where the wind lever 2 has not yet been operated since the shutter release process is performed. The route from Step 221 to Step 224 via Step 222 corresponds to a state where the wind lever 2 has been operated but has not yet returned to the accommodated position thereof. The route from Step 221 to Step 224 via Steps 222 and 223 corresponds to a state where the wind lever 2 has returned to the accommodated position thereof after having been turned to charge the shutter, so that the shutter-release permission flag is set to 1.

It is determined at Step 224 whether the currently-indexing flag is 1. It it is determined at Step 224 that the currently-indexing flag is not 1, control proceeds to Step 225 wherein it is determined whether the wind-up flag is 1. If it is determined at Step 225 that the wind-up flag is not 1, control proceeds to Step 226 wherein it is determined whether the wind-up-completion flag is 1. If it is determined at Step 226 that the wind-up-completion flag is not 1, control proceeds to Step 227 wherein it is determined whether the rear-cover-open flag is 1. If it is determined at Step 227 that the rear-cover-open flag is not 1, control proceeds to Step 229 wherein it is determined whether the wind-lock-release permission flag is 1.

If the flag at any one of the Steps 224 through 227 is 1, control proceeds to Step 228 wherein the shutter-release permission flag is set to 0 and subsequently control proceeds to Step 229. This control is provided to prohibit the shutter release process from being performed during the time the rear cover 6 is open, during the time the film indexing process is performed or during the time the film is wound. If all the flags are zero at Steps 224 through 227, control skips Step 228 to proceed to Step 229.

If it is determined at Step 229 that the wind-lock-release permission flag is 1, control proceeds to Step 230 wherein it is determined whether the shutter-release permission flag is 1. If it is determined at Step 230 that the shutter-release permission flag is not 1, control proceeds to Step 231 wherein it is determined whether the switch SW1 is OFF. If it is determined at Step 231 that the switch SW1 is OFF, control proceeds to Step 232 wherein the wind-lock-release permission flag is set to 0. Subsequently, at Step 233 the wind-lock-release permission process is performed in which power is supplied to the windlock release magnet Mg3 to allow the gear-ratchet mechanism 17 to operate, which makes it possible to turn the wind lever 2. Due to the wind-lock-release permission process, power is supplied to the wind-lock release magnet Mg3, which makes it possible to wind the film by operating the wind lever 2.

If it is determined at Step 229 that the wind-lock-release permission flag is not 1, control skips Steps 230 through 233 to return to the main process. If it is determined at Step 230 that the shutter-release permission flag is 1, control skips Steps 231 through 233 to return to the main process. If it is determined at Step 231 that the switch SW1 is ON, control skips Steps 232 and 233 to return to the main process.

The wind-lock-release process at Step 233 is performed only when control takes the route from Step 229 to Step 233 via Steps 230, 231 and 232. Control skips Steps 231, 232 and 233 in the case where it is determined that the shutter-release permission flag is 1 at Step 230. This control prevents the film from being wound by more than one frame at a time since the shutter release is permitted at Step 223 after the film has been wound by one frame. Control skips Steps 232 and 233 in the case where it is determined at Step 231 that the switch SW1 is ON. This control prevents a mechanical problem from occurring if the wind-lock-release permission process is performed with the wind lever 2 positioned at any other position than the accommodated position thereof. Control returns to the main process in the case where it is determined at Step 229 that the wind-lock-release permission flag is not 1, since it is not necessary to release the wind lock.

In a state where the rear cover 6 is open, the shutter-release permission flag is set to 0 since the currently-indexing flag, the wind-up flag and the wind-up-completion flag are all set to 0 while the rear-cover-open flag is 1. Furthermore, the wind-lock-release permission flag is set to 0 since the switch SW is OFF when the wind lever 2 is in the accommodated position thereof. Therefore, in a state where the rear cover 6 is open, control returns to the main process after the wind-lock-release permission process is performed.

After the camera-body-state checking process at Step 9, the indicating process at Step 10 is performed. Subsequently, the conditions for sleep mode recovery are set (Step 11). Subsequently, control enters a sleep mode to save power (Step 12).

Control exits the sleep mode to enter the film-feed-transfer checking process at Step 13 immediately after any one of the photometering switch SW4, the release switch SW6 or the switch SW1 is turned ON, or immediately after the time interval (125 ms) elapses. The film-feed-transfer checking process at Step 13 is identical to the film-feed-transfer checking process at Step 8.

In the film-feed-transfer checking process at each of Steps 8 and 13, control proceeds to the film-feed-transfer process at Step 107 if the rear cover 6 is open with the switch SW1 ON.

In the film-feed-transfer process, any one of the processes at Steps 309 through 314 is selected in accordance with a state of the camera.

In the film-feed-transfer process, as shown in FIG. 7, firstly a pulse-count-completion flag is set to 0 (Step 301). Subsequently control proceeds to Step 302 wherein it is determined whether the rear-cover-open flag is 1. If it is determined at Step 302 that the rear-cover-open flag is not 1, control proceeds to Step 303 wherein it is determined whether a currently-indexing flag is 1. If it is determined at Step 303 that the currently-indexing flag is not 1, control proceeds to Step 304 wherein it is determined, whether the no-film flag is 1. If it is determined at Step 304 that the no-film flag is not 1, control proceeds to Step 305 wherein it is determined whether the winding flag is set to 1. If it is determined at Step 305 that the winding flag is not set to 1, control proceeds to Step 306 wherein it is determined whether the wind-up flag is 1. If it is determined at Step 306 that the wind-up flag is not 1, control proceeds to Step 307 wherein it is determined whether the wind-up-completion flag is 1. If it is determined at Step 307 that the wind-up completion flag is not 1, control proceeds to Step 308 wherein the photo-interrupter 12a (an element of the pulse generator 12) is turned OFF and subsequently returns to the film-feed-transfer checking process. Subsequently control returns to the main process.

If it is determined at Step 302 that the rear-cover-open flag is 1, control proceeds to Step 309 wherein the idle-winding processs is performed. If it is determined at Step 303 that the currently-indexing flag is 1, control proceeds to Step 310 wherein the film indexing process is performed. If it is determined at Step 304 that the no-film flag is 1, control proceeds to Step 311 wherein the idle-winding process is performed. If it is determined at Step 305 that the winding flag is 1, control proceeds to Step 312 wherein the single-frame-winding process is performed. If it is determined at Step 306 that the wind-up flag is 1, control proceeds to Step 313 wherein the wind-up process is performed. If it is determined at Step 307 that the wind-up-completion flag is 1, control proceeds to Step 314 wherein the idle-winding process is performed. After any one of the processes of Steps 309 through 314 is performed, control proceeds to Step 308 wherein the photo-interrupter 12a is turned OFF, and subsequently returns to the film-feed-transfer checking process. Thereafter, control returns to the main process.

Since it is herein assumed that the wind lever 2 is operated with the rear cover 6 open, it is determined at Step 302 that the rear-cover-open flag is 1, so that control proceeds to Step 309 wherein the idle-winding process is performed.

Figure 8:
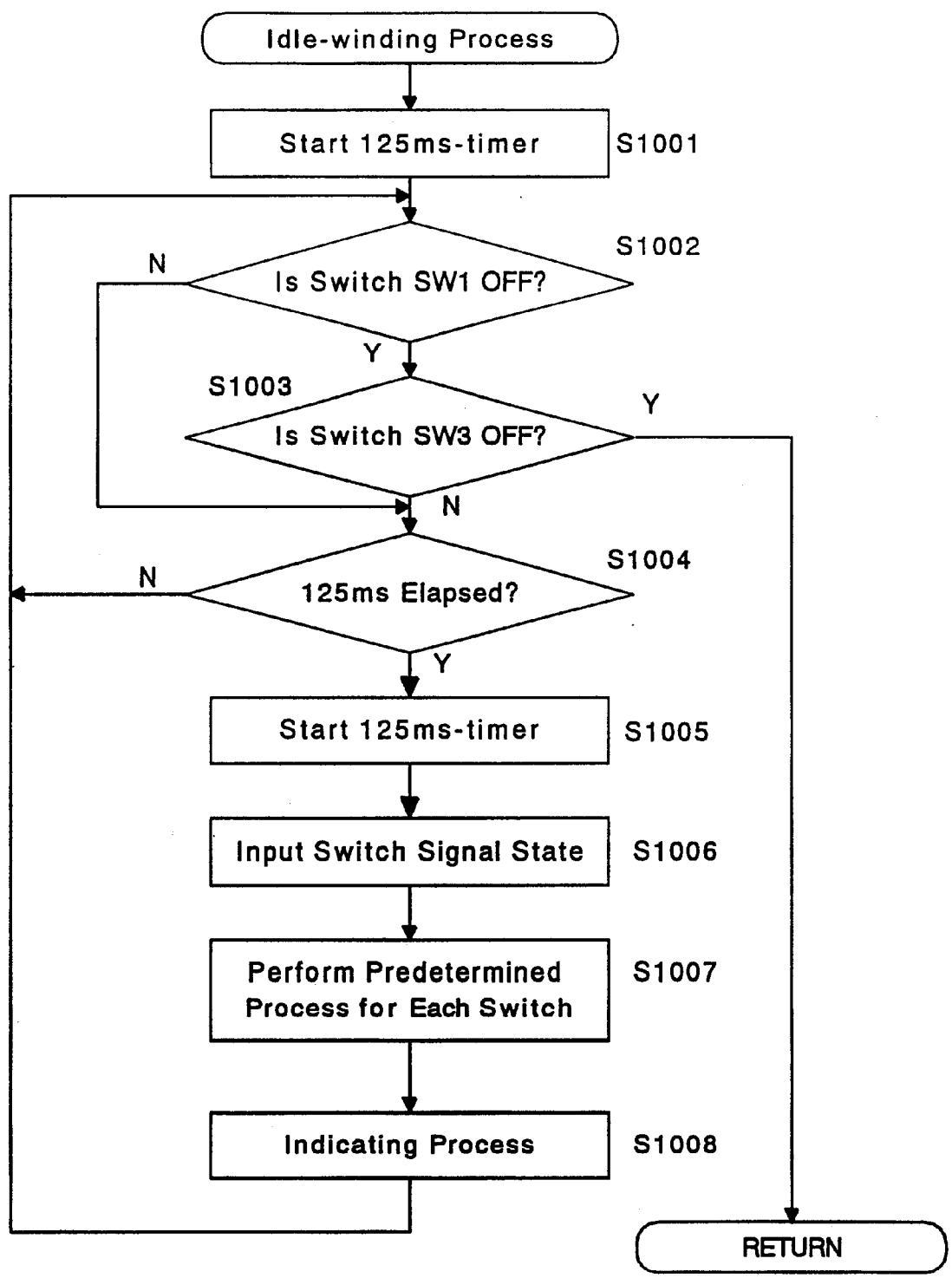
FIG. 8 is a flow chart which illustrates the idle-winding process of the manual-wind camera shown in FIG. 1.

FIG. 8 shows the idle-winding process of Steps 309 and 314 of FIG. 7. In this process, firstly a 125 ms-timer is started (Step 1001). Subsequently it is determined whether the switch SW1 is OFF (Step 1002). In the idle-winding process, the 125 ms-timer is used to perform the indicating process every 125 ms.

In the case where the wind lever 2 is positioned at a position other than the accommodated position thereof, namely at any rotational position within a rotational angle from 10 to 180 degrees ($10°≦θ≦180°$), it is determined at Step 1002 that the switch SW1 is not OFF, so that control proceeds to Step 1004. It is determined at Step 1004 whether the time interval of 125 ms has elapsed. The operations at Steps 1002 and 1004 are repeatedly performed until the time interval of 125 ms elapses. If it is determined at Step 1004 that the time interval of 125 ms has elapsed, control proceeds to Step 1005 wherein the 125 ms-timer is started again. Subsequently the state of signal output from each of the switches SW, SW1, SW3 through SW7 is input into the CPU 8 (Step 1006). For each of the switches SW, SW1, SW3 through SW7 a predetermined process corresponding to the state of the switch is performed (Step 1007). Thereafter the indicating process is performed (Step 1008) and thereafter control returns to the operation at Step 1002.

The operations at Steps 1005 through 1008 are repeatedly performed every 125 ms until the wind lever 2 returns to the accommodated position thereof.

Immediately after the wind lever 2 returns to the accommodated position thereof, it is determined at Step 1002 that the switch SW1 is OFF and subsequently control proceeds to Step 1003 wherein it is determined whether the switch SW3 is OFF. If it is determined at Step 1003 whether the switch SW3 is not OFF, control proceeds to Step 1004. If it is determined at Step 1003 that the switch SW3 is OFF, control returns to the main process. The operations from Step 1002 to Step 1008 are repeatedly performed until the switch SW3 is turned OFF, i.e., until the shutter charge completes and the wind lever 2 returns to the accommodated position thereof. The photo-interrupter 12a is OFF during the idle-winding process.

After control enters the camera-body-state checking process with the rear cover 6 open after returning to the main process, the film can be wound by repeating the operation of turning the wind lever 2 from the accommodated position to the maximum rotational angle position thereof since the wind-lock-release permission flag is set to 1 via the operations at Steps 214, 215 and 216. By such an operation of the wind lever 2, the marking which is printed on the backing paper (not shown) of the film 22, to indicate the position from which pictures can be taken, can be positioned to correspond to the predetermined reference marking (not shown) formed on the aperture frame 1a. In this case, the shutter is prohibited from being released, since the shutter-release permission flag is set to 0 at Step 228 even though it is set to 1 at Step S223.

Case No. 2: The Film Indexing Process

Upon entering the camera-body-state checking process at Step 9 during the time the main process is performed, control proceeds to Step 201 (shown in FIG. 6A) wherein it is determined whether the rear-cover-state detector switch SW is OFF, i.e., whether the rear cover 6 is open. If the rear cover 6 is closed, it is determined at Step 201 that the rear-cover-state detector switch SW is not OFF, so that control proceeds to Step 207 wherein it is determined whether the rear-cover-state detector switch SW was previously OFF (i.e., whether the rear cover 6 was previously open). If it is determined at Step 207 that the rear-cover-state detector switch SW was previously OFF, control proceeds to Step 208 wherein all the body-state-indicating flags are set to 0 because it is the first time for the camera-body-state checking process to be performed since the rear-cover 6 was closed. Subsequently control proceeds to Step 209 wherein the currently-indexing flag is set to 1. Subsequently control proceeds to Step 210. If it is determined at Step 207 that the rear-cover-state detector switch SW was not previously OFF (i.e., the rear cover 6 was previously closed), control skips the operations at Steps 208 and 209 to proceed to Step 210.

Thereafter, since the currently-indexing flag has been set to 1 at Step 209, the shutter-release permission flag is set to 0 at Step 228 further on in the camera-body-state checking process, so that the shutter is prohibited from being released during the film indexing process.

Thereafter, if control enters the film-feed-transfer checking process at Step 8 or Step 13 in the main process after control returns to the main process, and if the switch SWI is turned ON by the operation of the wind lever 2, it is determined at Step 102 that the currently-indexing flag is 1, so that control proceeds to Step 107 wherein the film-feed-transfer process shown in FIG. 7 is performed.

Thereafter it is determined at Step 303 (shown in FIG. 7) that the currently-indexing flag is 1, so that control proceeds to Step 310 wherein the film indexing process (shown in FIG. 9) is performed.

Figure 9:
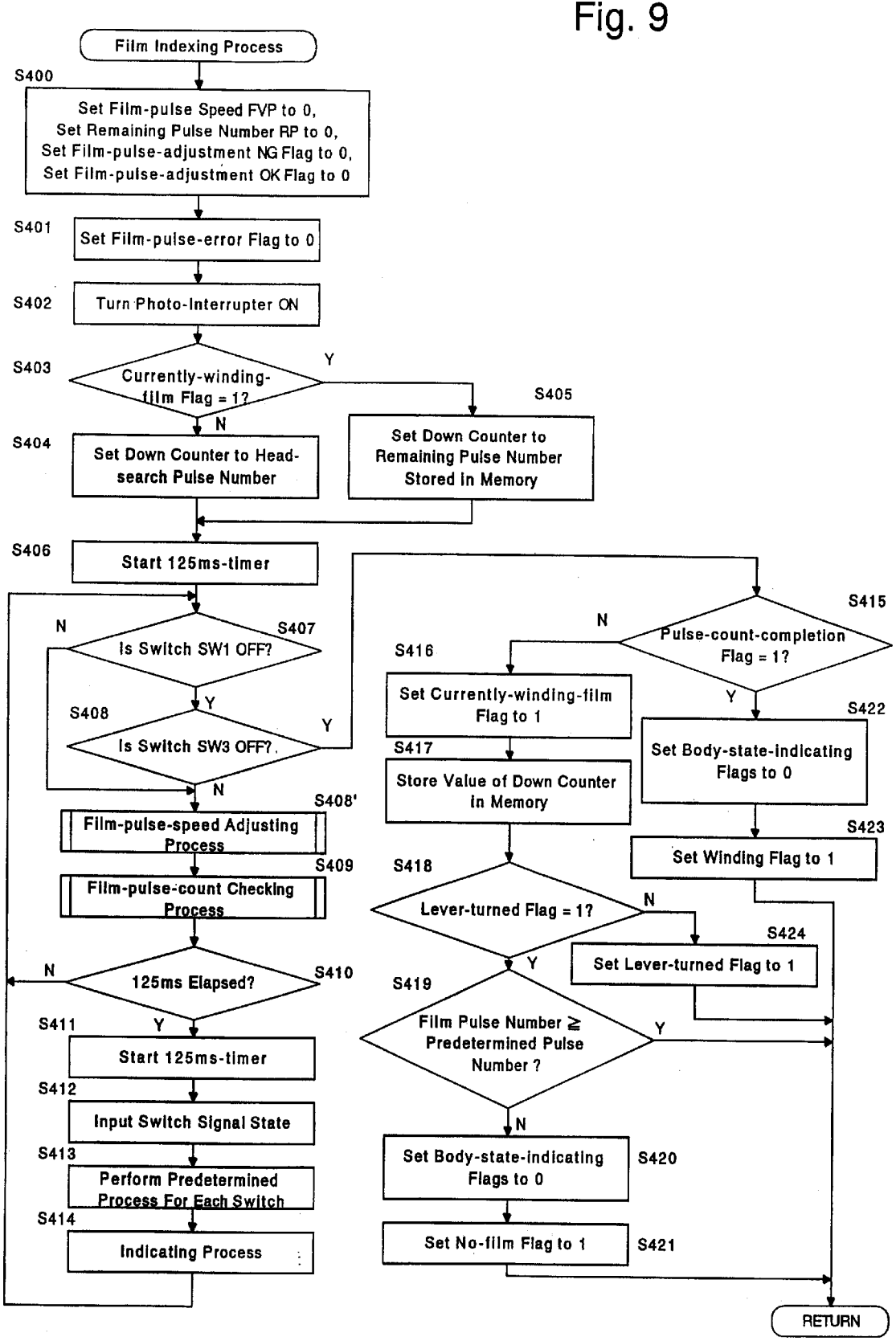
FIG. 9 is a flow chart which illustrates the film indexing process of the manual-wind camera shown in FIG. 1.

In the film indexing process, as shown in FIG. 9, a film-pulse-error flag is set to 0 (Step 401). Subsequently, the photo-interrupter 12a is turned ON (Step 402). Subsequently, it is determined whether the currently-winding-film flag is 1 (Step 403). The film-pulse-error flag is set to 1 when control has entered the sleep mode in the main control at Step 12 if the wind lever has been released part way through the winding thereof.

The currently-winding-film flag is set to 1 when the number of pulses generated by an operation of the wind lever 2 does not reach either the number of pulses necessary for positioning the first frame over the photographic aperture or a predetermined reference number (i.e., single-frame-winding pulse number) necessary for winding the film by one frame.

Since the currently-winding-film flag has been set to 0 immediately after control enters the film indexing process, it is determined at Step 403 that the currently-winding-film flag is not 1, so that control proceeds to Step 404 wherein the counter value of the down counter 23 is set to the number of pulses for positioning the first frame over the photographic aperture (i.e., the number of pulses which corresponds to the amount of movement of the film 22 by approximately four frames). Subsequently the 125 ms-timer is started (Step 406). Thereafter, it is determined whether the switch SW1 is OFF (step 407).

Figure 10:
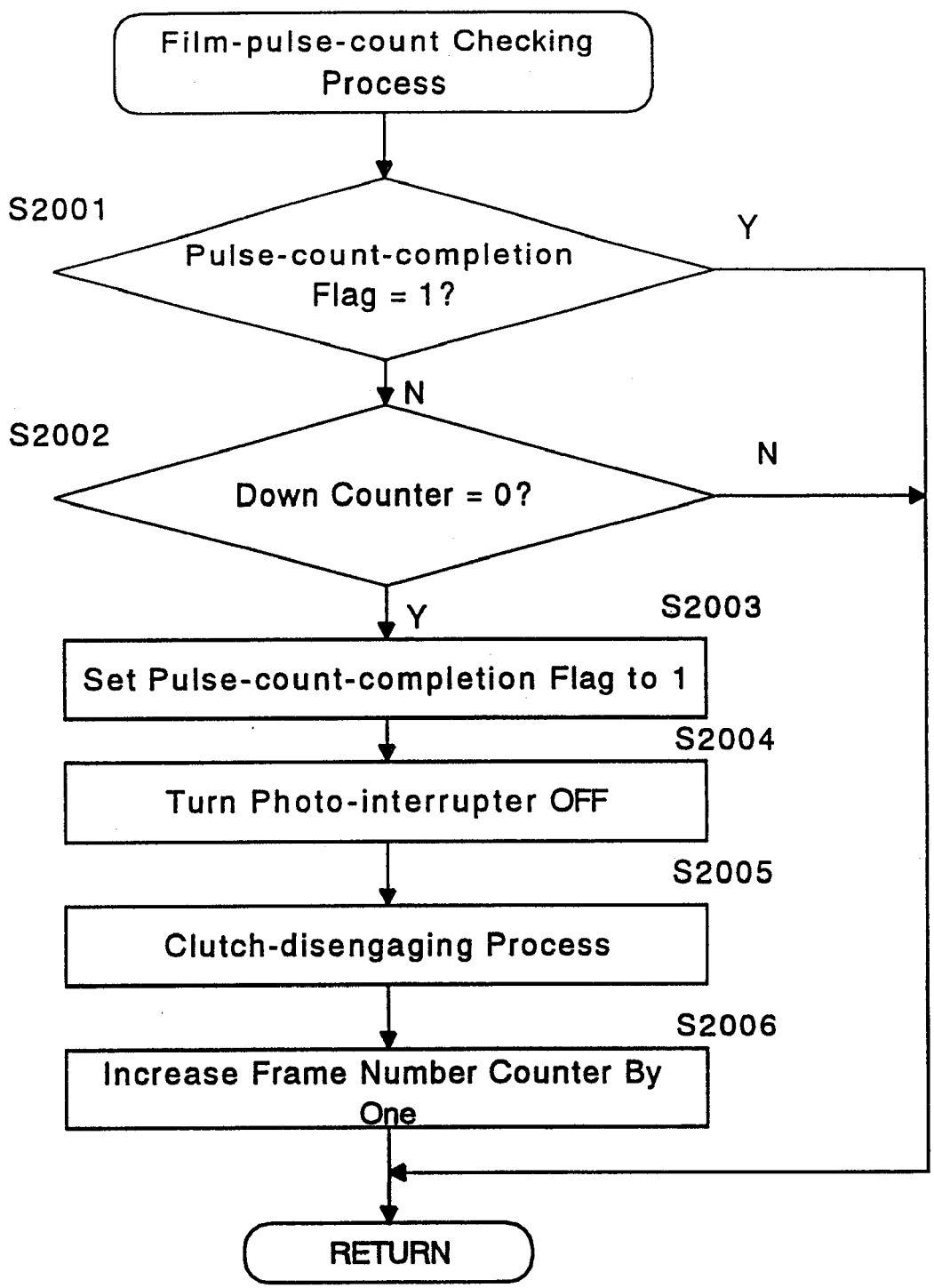
FIG. 10 is a flow chart which illustrates the film-pulse-count checking process of the manual-wind camera shown in FIG. 1.

During the time until the wind lever 2 returns to the accommodated position thereof after the wind lever 2 is operated, the switch SW1 remains ON, so that it is determined at Step 407 that the switch SW1 is not OFF. Therefore, control proceeds to Step 409 wherein the film-pulse-count checking process shown in FIG. 10 is performed.

In the film-pulse-count checking process, firstly it is determined whether a pulse-count-completion flag is 1 (step 2001). However, when the film starts to be wound, it is determined at Step 2001 that the pulse-count-completion flag is not 1 since the pulse-count-completion flag has been set to 0. Subsequently control proceeds to Step 2002 wherein it is determined whether the down counter 23 is zero. Conversely, if it is determined at Step 2001 that the pulse-count-completion flag is 1, control returns to the film indexing process to enter Step 410.

The pulse generator 12 generates pulses in accordance with the movement of the film 22 by operating the wind lever 2 to thereby decrease the counter value indicated by the down counter 23 stepwise. The counter value of the down counter 23 does not become zero at once, so that it is determined at Step 2002 that the down counter 23 is not zero and therefore control returns to the film indexing process to enter the operation at Step 410. On the other hand, if it is determined at Step 2002 that the down counter 23 is zero, control proceeds to Step 2003 wherein the pulse-count-completion flag is set to 1. Subsequently, the photo-interrupter 12a is turned OFF (Step 2004). Subsequently, the clutch-disengaging process (the clutch being connected via a frictional connection) is performed wherein the power supply to the electromagnetic clutch 18 is stopped, while the power supply to the film holding magnet Mg2 is started (Step 2005). Thereafter, the frame number counter is incremented by one (Step 2006), and control returns to the film indexing process to enter Step 410.

The route from Step 2001 to Step 410 via Step 2002 corresponds to the case where the first frame of the film 22 has not yet reached the photographic aperture. The route from Step 2001 to Step 410 via Steps 2002 through 2006 corresponds to the case where the number of pulses necessary for positioning the first frame over the photographic aperture has been counted, and thus the first frame is currently positioned over the photographic aperture.

It is determined at Step 410 whether the time interval of 125 ms has elapsed. The operations at Steps S407, 408, 409 and 410 are repeatedly performed before the time interval of 125 ms elapses. Immediately after the time interval of 125 ms elapses, the 125 ms-timer is started again (Step 411). Subsequently, the state of signal output from each of the switches SW, SW1, SW3 through SW7 is input into the CPU 8 (Step 412). Subsequently, for each of the switches SW, SW1, SW3 through SW7 a predetermined process corresponding to the state of the switch is performed (Step 413). Thereafter the indicating process is performed (Step 414) and control returns to Step 407.

Once the wind lever 2 is fully turned up to the maximum rotational position thereof, the SW3 is turned OFF while the shutter charge completes. It should be noted that the SW3 remains OFF in the case where it was previously OFF.

It is determined at Step 407 that the switch SW1 is OFF immediately after the wind lever 2 returns to the accommodated position thereof. Subsequently it is determined whether the switch SW3 is OFF (Step 408). If it is determined at Step 408 that the switch SW3 is OFF, control proceeds to Step 415. Accordingly, the route from Step 407 to Step 415 via Step 408 corresponds to the case where the wind lever 2 has been turned once.

It is determined at Step 415 whether the pulse-count-completion flag is 1. If it is determined that the pulse-count-completion flag is not 1, it means that the film winding operation has not yet completed, so that control proceeds to Step 416 wherein the currently-winding-film flag is set to 1. Subsequently the counter value of the down counter 23 is temporarily stored in the memory 24 (Step 417).

Subsequently, it is determined whether the lever-turned flag is 1 (Step 418). The lever-turned flag is set to 1 when the wind lever 2 has been rotated to turn the SW1 ON after the rear cover 6 is closed.

It is determined whether the wind lever 2 has been fully turned from the accommodated position to the maximum rotational position thereof via Steps 407 and 408. When control proceeds to Step 415, namely, when each of the switch SW1 and the switch SW3 is OFF (i.e., the wind lever 2 returns to the accommodated position thereof after having been fully turned from the accommodated position to the maximum rotational position thereof), it is determined that the wind lever 2 has been fully turned to wind the film 22 by one frame.

In a state immediately after the rear cover 6 is closed, there is probability that the wind lever 2 will be positioned somewhere between the accommodated position and the maximum rotational position. Due to this, it cannot be determined that the wind lever 2 has been fully turned from the accommodated position to the maximum rotational position thereof simply by determining that the switch SW1 and the switch SW3 is turned OFF by the first winding operation of the wind lever 2 after the rear cover 6 is closed.

Figure 6A:
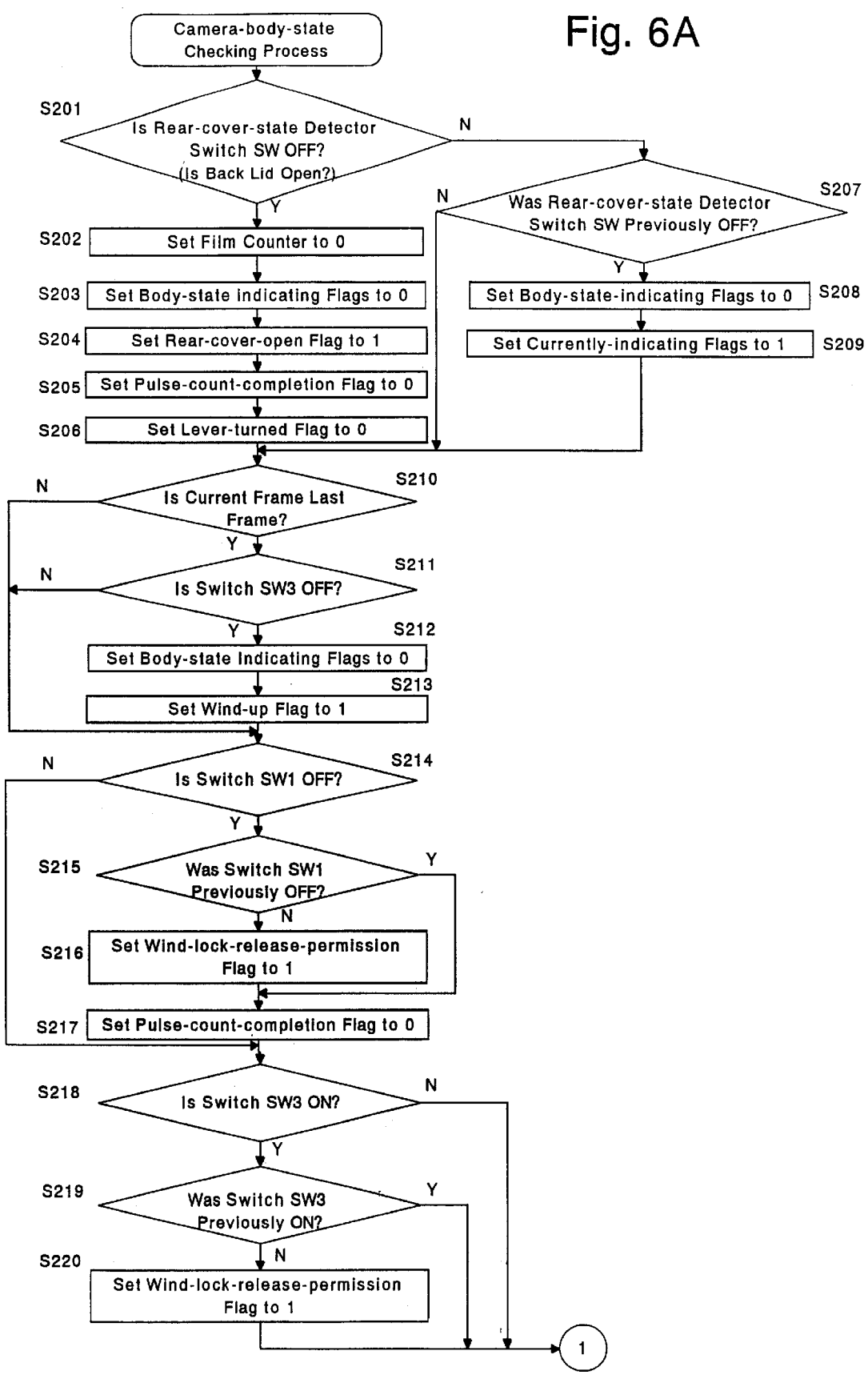
FIGS. 6A and 6B are flow charts which illustrate the camera-body-state checking process of the manual-wind camera shown in FIG. 1.
Figure 6B:
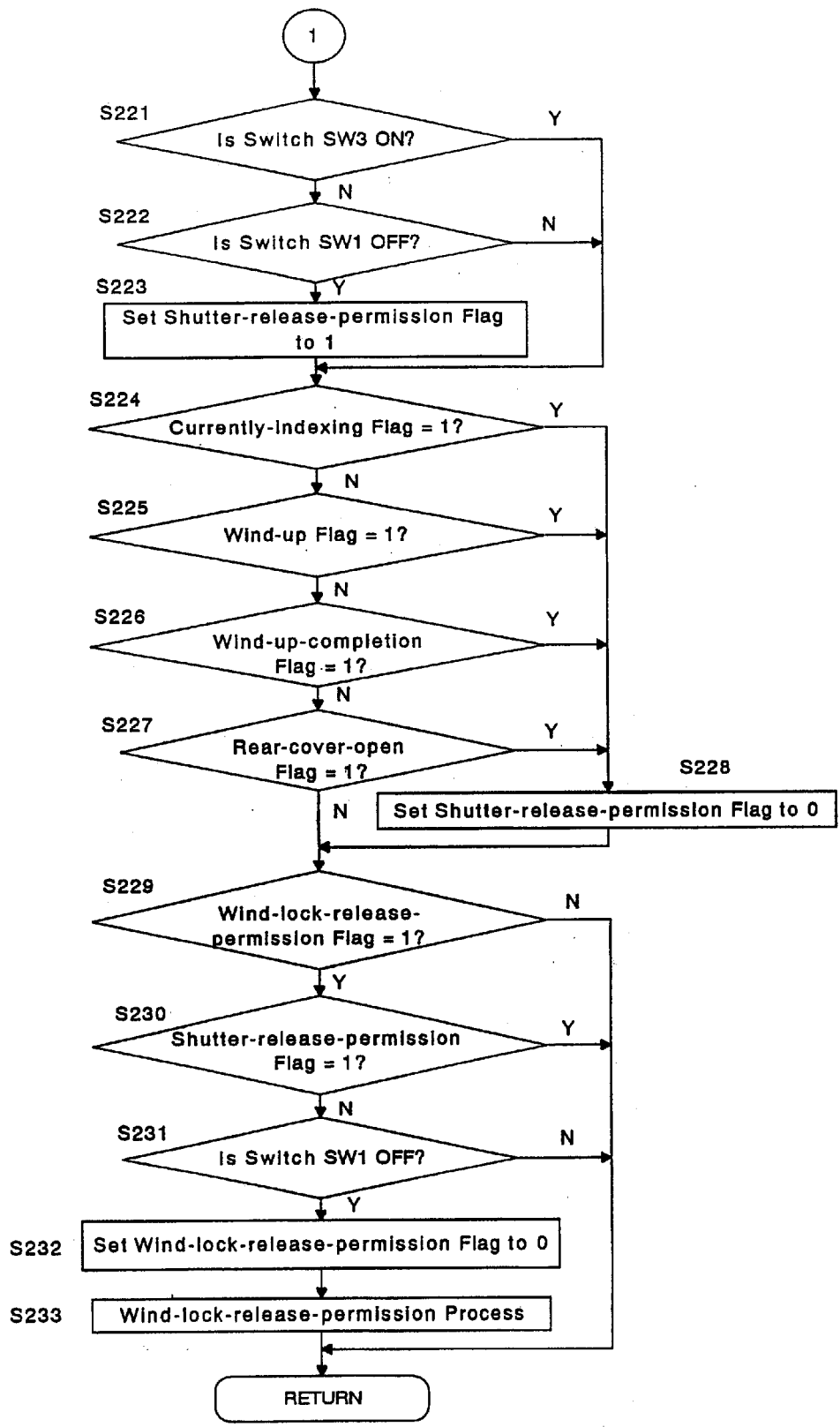

To overcome such a problem, in the present embodiment of the camera, the lever-turned flag is set to 0 at Step 206, shown in FIG. 6A, immediately after the rear cover 6 is opened. Further, when control enters the operation at Step 418 by the operation (first winding operation) of the wind lever 2 for the first time after the rear cover is closed, control returns once to the film-feed-transfer process shown in FIG. 7 after the lever-turned flag is set to 1 at Step 424. Note that control exits the indexing process after Step 424. Thereafter control first proceeds to Step 419 only after control re-enters the operation at Step 418 by the second winding operation of the wind lever 2 after the rear cover is closed. Due to this control, it is not determined whether the film has been loaded in the camera in accordance with pulses which are generated when the wind lever 2 is turned from an intermediate position (which is in between the accommodated position and the maximum rotational position) to the maximum rotational position thereof because there is probability that no pulses are generated 12 when the wind lever 2 has been turned or has almost been turned to the maximum rotational position thereof.

It is determined at Step 419 whether the number of pulses generated by the pulse generator 12 is equal to or more than a predetermined number of pulses, i.e., whether the counter value of the down counter 23 has decreased by the predetermined number of pulses or more than the predetermined number of pulses. If it is determined at step 419 that pulses generated by the pulse generator 12 is less than the predetermined number of pulses, control proceeds to Step 420 wherein all the body-state-indicating flags are set to 0. Subsequently control proceeds to Step 421 wherein the no-film flag is set to 1. Accordingly, whether the film 22 has been loaded in the camera can be determined using software via the operation at Step 419. The reason why it is determined whether the film 22 has been loaded in the camera by detecting the second winding operation of the wind lever 2 after the rear cover is closed is that it is necessary for the wind lever 2 to have been fully turned from the accommodated position to the maximum rotational position thereof, in order to improve the precision in determining whether the film 22 has been loaded in the camera. The details thereof will be discussed later.

In other words, it is determined whether the film 22 has been loaded in the camera by performing the operations at Steps 419 through 421 after the second winding operation of the wind lever 2 is detected. The operation of the wind lever 2 for the first time after the rear cover 6 is closed is determined as the first winding operation of the wind lever 2. In the case of detecting the first winding operation of the wind lever 2, control skips the operations at Steps 419 through 421 when the wind lever 2 is turned to the maximum rotational position thereof from the initial position or any other intermediate position thereof. Such a control improves the precision in determining whether the film 22 has been loaded in the camera. In other words, in the embodiments, upon closing the rear cover 6, the number of pulses which are generated upon the rotation of the wind lever 2 to the maximum rotational position for the first time is ignored, and the number of pulses generated upon the second rotation of the wind lever 2 to the maximum rotational position is calculated in order to judge whether or not the film 22 has been loaded into the camera.

In the case where the film 22 has been loaded in the camera, the counter value of the down counter 23 does not become zero by turning the wind lever 2 once or twice during the time the film is being wound to position the first frame over the photographic aperture, after the rear cover 6 is closed, so that the film indexing process shown in FIG. 9 is repeatedly performed more than once. Thereafter control enters the film-pulse-count checking process during the time the indexing process is performed. After control enters the film-pulse-count checking process, if the value of the down counter 23 becomes zero, it is considered that the number of pulses necessary for positioning the first frame over the photographic aperture has been counted, so that the pulse-count-completion flag is set to 1 at Step 2003. Subsequently, the photo-interrupter 12a is turned OFF (Step 2004), the clutch-disengaging process is performed (Step 2005) and the number of the frame number counter is increased by one (Step 2006).

The power supply to the electromagnetic clutch 18 is stopped via the clutch-disengaging process, to cut off the drive power of the wind lever 2 while the power supply to the film holding magnet Mg2 starts to lock the take-up spool 20 to thereby stop the movement of the film 22.

Figure 13A:
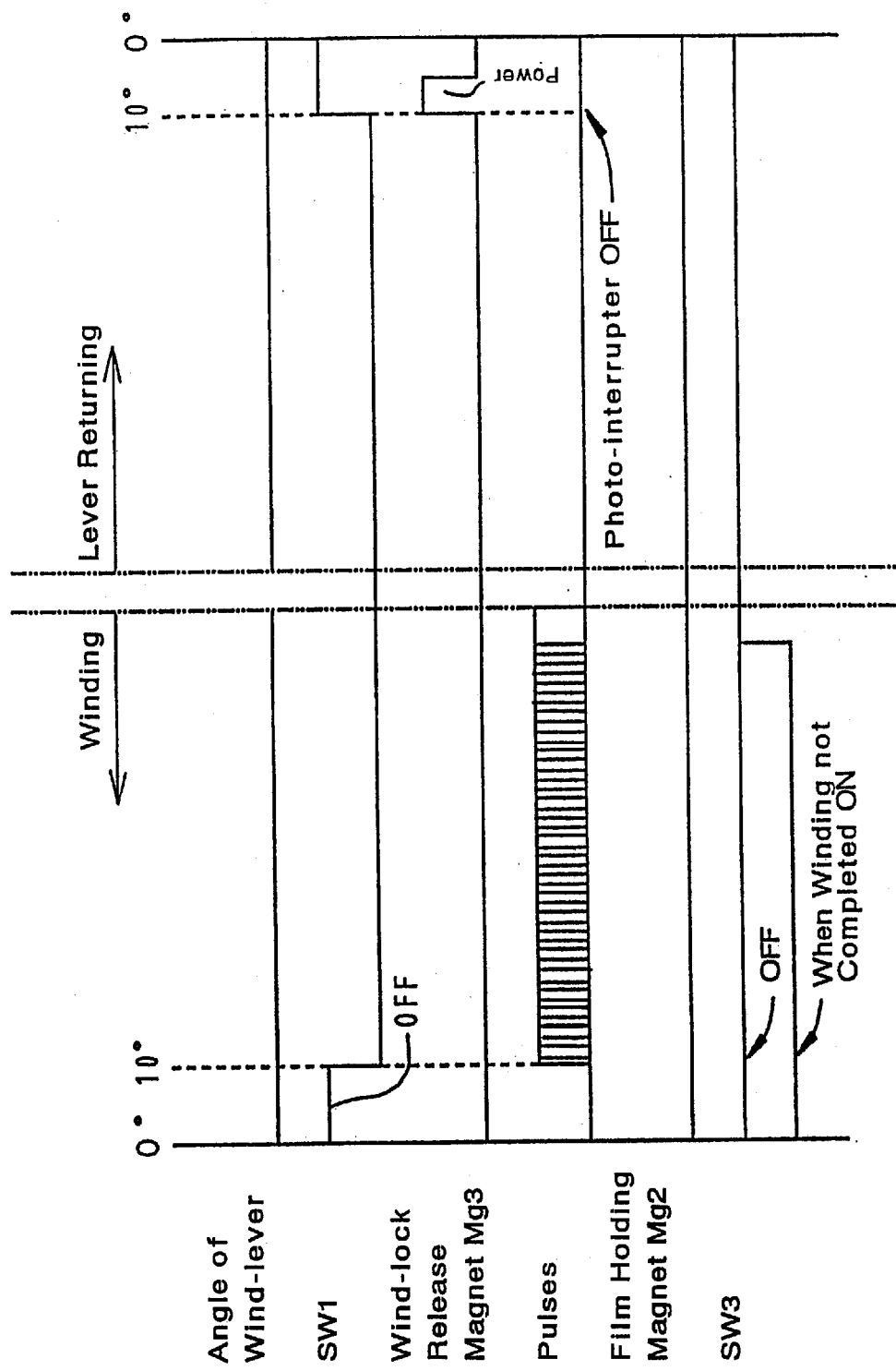
FIG. 13A is a chart for illustrating the sequence of the film indexing process in the case where film is loaded in the camera, showing a state where pulses are generated by each of the first and some subsequent winding operations of the wind lever.

Therefore, in an initial stage of winding of the film to position the first frame over the photographic aperture by operating the wind lever 2, turning the wind lever 2 causes the pulse generator 12 to generate pulses during the time from the moment the switch SW1 is turned ON to the moment the wind lever 2 reaches the maximum rotational position thereof, as shown in FIG. 13A. If the shutter charge completes by fully turning the wind lever 2, the switch SW3 is turned OFF (Yes at Step 408). Thereafter, upon the wind lever 2 returning to the accommodated position thereof (Yes at Step 214 and No at Step 215), the photo-interrupter 12a is turned OFF (Step 2004) and at the same time power is supplied to the wind-lock release magnet Mg3 to release the wind lock (Step 216). Thereafter, in a final stage of winding of the film to position the first frame over the photographic aperture by operating the wind lever 2, when the number of pulses necessary for positioning the first frame over the photographic aperture has been counted while the wind lever 2 is operated (Yes at Step 2002), the photo-interrupter 12a is turned OFF (Step 2004) and at the same time power supply to the film holding magnet Mg2 is started to hold the take-up spool 20 to thereby stop the movement of the film 22, as can be seen from FIG. 13B (Step 2005).

Thereafter, at Step 415 in the film indexing process shown in FIG. 9, it is determined that the pulse-count-completion flag is 1, so that control proceeds to Step 422 wherein all the body-state-indicating flags are set to 0. Subsequently control proceeds to Step 423 wherein the winding flag is set to 1. Thereafter, control returns to the film-feed-transfer process shown in FIG. 7.

When control enters the film indexing process via the camera-body-state checking process, if the film 22 has been loaded in the camera, the frame number "1" is indicated on the external LCD panel 7 after the film indexing process completes. Thereafter, the shutter is charged, the shutter is permitted to be released, and the wind lever 2 is locked.

After control returns to the main process, if the photometering switch SW4 is turned ON during the time the operations at Steps 4 through 13 are performed, it is determined at Step 7 (shown in FIG. 4) that the photometering switch SW4 is ON, so that control proceeds to Step 14 wherein a power-hold-timer is set to a predetermined initial time value. Subsequently, control proceeds to Step 15 wherein the state of signal output from each of the switches SW, SW1, SW3 through SW7 is input into the CPU 8. Subsequently, for each of the switches SW, SW1, SW3 through SW7 a predetermined process corresponding to the state of the switch is performed (Step 16). Thereafter, luminance information Bv is input into the CPU 8 (Step 17) and aperture value information AVVR is input into the CPU 8 (Step 18). Subsequently the photometering operation process is performed in accordance with the input information Bv and AVVR (Step 19), and thereafter, control enters the camera-body-state checking process at Step 20.

After the camera-body-state checking process at Step 20, control enters Step 21 wherein the indicating process is performed. Subsequently control proceeds to Step 22 wherein the film-feed-transfer checking process is performed. Subsequently control quickly exits the film-feed-transfer checking process to proceed to Step 23 if the wind lever 2 is not operated. It is determined at Step 23 whether the shutter-release permission flag is 1.

If it is determined at Step 23 that the shutter-release permission flag is 1, control proceeds to Step 24 wherein it is determined whether the release switch SW6 is ON. If it is determined at Step 24 that the release switch SW6 is ON, control proceeds to Step 25 wherein the shutter release switch is performed and at the same time the shutter-release permission flag is set to 0. Subsequently the pulse-count-completion flag is set to 0 (Step 26) and the value of the power-hold-timer is decreased by one (Step 27). Subsequently it is determined whether the value of the power-hold-timer is zero (Step 28).

If it is determined at Step 28 that the value of the power-hold-timer is zero, control returns to Step 4. If it is determined at Step 28 that the value of the power-hold-timer is not zero, control returns to Step 15. If it is determined at Step 23 that the shutter-release permission flag is not 1, control skips Steps 24, 25 and 26 to proceed to Step 27 so as to prohibit the shutter release process from being performed.

The route from Step 23 through Step 26 corresponds to the operation of the shutter release by which the shutter curtain is driven. This causes the switch SW3 to be turned ON and at the same time the power supply to the film holding magnet Mg2 is stopped to unlock the take-up spool 20.

If control enters the camera-body-state checking process (shown in FIGS. 6A and 6B) during the subsequent operation of the main process, it is determined at Step 218 that the switch SW3 is ON, so that control proceeds to Step 219. At Step 219 it is determined that the switch SW3 was not previously ON, so that the wind-lock-release permission flag is set to 1 (Step 220) and subsequently proceeds to Step 221.

Subsequently, it is determined at Step 221 that the switch SW3 is ON (i.e. the camera is in a state wherein the winding operation is not performed), so that control skips Steps 222 and 223 to proceed to Step 224 to thereby prohbit the shutter-release permission flag from being set.

Subsequently, after performing the operations at Steps 224 through 227, control proceeds to Step 229 wherein it is determined whether the wind-lock-release permission flag is 1. It is determined at Step 229 that the wind-lock-release permission flag is 1 since the wind-lock-release permission flag has been set to 1 at Step 220, so that control proceeds to Step 230. It is determined at Step 230 that the shutter-release permission flag is not 1, and at Step 231 that the switch SW1 is OFF, so that control performs the operations at Steps 232 and 233 and subsequently returns to the main process.

Due to the operations at Steps 232 and 233, the wind-lock-release permission process is performed, which makes it possible to wind the film by operating the wind lever 2.

Case 3: The winding Process

If the wind lever 2 is operated during the time the main process is performed after the shutter is released, it is determined at Step 106 that the switch SW3 is ON, so that control proceeds Step 107 wherein the film-feed-transfer process shown in FIG. 7 is performed.

In the film-feed-transfer process, since the winding flag has been set to 1 at Step 423, control proceeds from Step 305 to Step 312 wherein the winding process is performed.

Figure 11:
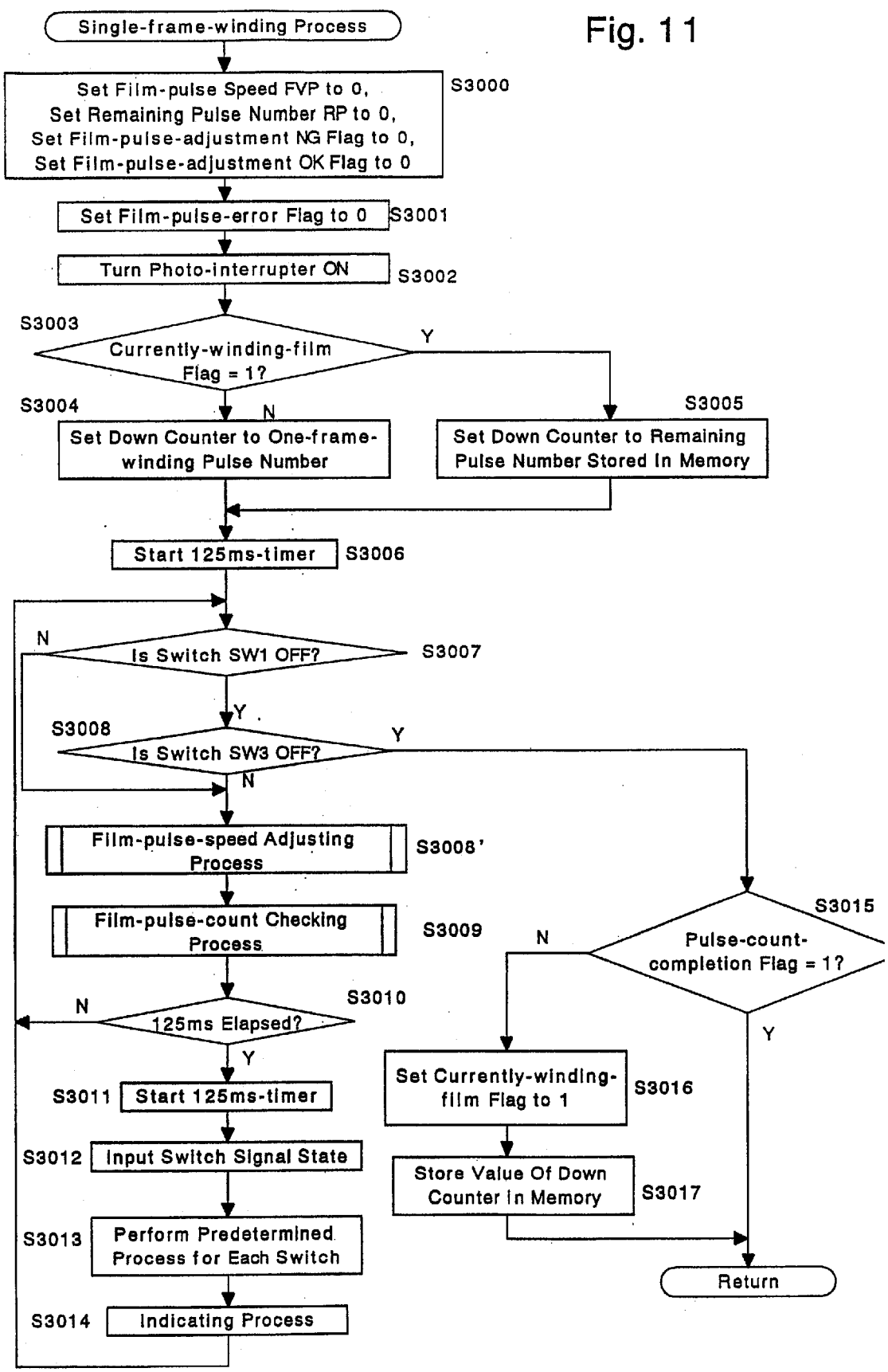
FIG. 11 is a flow chart which illustrates the single-frame-winding process of the manual-wind camera shown in FIG. 1.

In the winding process, as shown in FIG. 11, firstly the film-pulse-error flag is set to 0 (Step 3001) and the photo-interrupter 12a is turned ON (Step 3002). Thereafter, it is determined whether the currently-winding-film flag is 1 (Step 3003). The currently-winding-film flag is set to 1 when the number of pulses generated by an operation of the wind lever 2 does not reach a predetermined reference number (i.e., single-frame-winding pulse number) necessary for winding the film by one frame. However, the currently-winding-film flag has been set to 0 before control enters the winding process.

Since the currently-winding-film flag has been set to 0 immediately after control enters the winding process, it is determined at Step 3003 that the currently-winding-film flag is not 1, so that control proceeds to Step 3004 wherein the counter value of the down counter 23 is set to the single-frame-winding pulse number. Subsequently the 125 ms-timer is started (Step 3006) and thereafter, it is determined whether the switch SW1 is OFF (Step 3007).

During the time until the wind lever 2 returns to the accommodated position thereof after the wind lever 2 is operated, the switch SW1 remains ON, so that it is determined at Step 3007 that the switch SW1 is not OFF. Therefore, control proceeds to Step 3009 wherein the film-pulse-count checking process shown in FIG. 10 is performed.

In the film-pulse-count checking process, firstly it is determined whether a pulse-count-completion flag is 1 (Step 2001). At the time the film starts to be wound, it is determined at Step 2001 that the pulse-count-completion flag is not 1 since the pulse-count-completion flag has been set to 0. Subsequently control proceeds to Step 2002 wherein it is determined whether the down counter 23 is zero. If it is determined at Step 2001 that the pulse-count-completion flag is 1, control returns to the film indexing process to enter Step 410.

The pulse generator 12 generates pulses in accordance with the movement of the film 22 by operating the wind lever 2 to thereby decrease the counter value indicated by the down counter 23 step by step. The value of the down counter 23 does not become zero at once, so that it is determined at Step 2002 that the down counter 23 is not zero, and therefore control returns to the winding process to enter Step 3010. On the other hand, if it is determined at Step 2002 that the down counter 23 is zero, control proceeds to Step 2003 wherein the pulse-count-completion flag is set to 1. Subsequently, the photo-interrupter 12a is turned OFF (Step 2004). Thereafter, the clutch-disengaging process is performed through which the power supply to the electromagnetic clutch 18 is stopped, while the power supply to the film holding magnet Mg2 is started (Step 2005). Subsequently, the number of the frame number counter is increased by one (Step 2006), and control returns to the single-frame-winding process at Step 3010.

The route from Step 2001 to Step 3010 via Step 2002 corresponds to a state where the film is currently being wound. The route from Step 2001 to Step 3010 via Steps 2002 through 2006 corresponds to the case where the single-frame-winding pulse number has been counted, and thus one frame is currently positioned over the photographic aperture during the time of operation of the wind lever 2, from the accommodated position to the maximum rotational position thereof.

The operations from Step 3010 to Step 3014 are the same as the operations from Step 410 to Step 414, so that the details of the operations from Step 3010 to Step 3014 will not be herein discussed.

Immediately after the wind lever 2 returns to the accommodated position thereof, it is determined at Step 3007 that the switch SW1 is OFF, and control proceeds to Step 3008 wherein it is determined whether the switch SW3 is OFF. If it is determined at Step 3008 that the switch SW3 is OFF, control proceeds to Step 3015. Accordingly, the route from Step 3007 to Step 3015 via Step 3008 corresponds to a single winding operation of winding the film by one frame by operating the wind lever 2 after the shutter is released.

It is determined at Step 3015 whether the pulse-count-completion flag is 1. If it is determined at Step 3015 that the pulse-count-completion flag is not 1, it means that the film winding operation has not yet completed, so that control proceeds to Step 3016 wherein the currently-winding-film flag is set to 1. Subsequently the value of the down counter 23 is stored once in the memory 24 (Step 3017), and control returns to the film-feed-transfer process shown in FIG. 7.

Thereafter, immediately after control enters the film-pulse-count checking process at Step 3009, the value of the down counter 23 is decreased by one every time the pulse generated by the pulse generator 12 is detected. Upon having counted the number of pulses corresponding to the single-frame-winding pulse number, control proceeds from Step 2002 to Step 2003 wherein the pulse-count-completion flag is set to 1. Subsequently, the photo-interrupter 12a is turned OFF (Step 2004), the clutch-disengaging process is performed (Step 2005), and the frame number counter is incremented by one (Step 2006). Subsequently, control returns to the film indexing process to enter Step 410.

Once the wind lever 2 is fully turned up to the maximum rotational position thereof, the SW3 is turned OFF while the shutter charge completes. At the moment the number of pulses corresponding to the single-frame-winding pulse number have been counted, the take-up spool 20 is locked to thereby stop the movement of the film 22.

After the film-feed-transfer process is performed, if control enters the camera-body-state checking process shown in FIGS. 6(A, B) during the time the main process is performed, it is determined at Step 221 that the switch SW3 is not ON, it is determined at Step 222 that the switch SW1 is OFF, the shutter-release permission flag is set to 1 at Step 223, it is determined at Step 224 that the currently-indexing flag is not 1, it is determined at Step 225 that the wind-up flag is not 1, it is determined at Step 226 that the wind-up-completion flag is not 1, and it is determined at Step 227 that the rear-cover-open flag is not 1. Thereafter, control proceeds to Step 229 wherein it is determined whether the wind-lock-release permission flag is 1.

Although control proceeds from Step 229 to Step 230 since the wind-lock-release permission flag has been set to 1 at Step 216, control skips Steps 231, 232 and 233 because the shutter-release permission flag has been set to 1. Therefore, control returns to the main process without the wind-lock-release permission process being performed. This control prevents the film from being wound by more than one frame at a time.

Photographs are taken through the processes mentioned above. After taking the last exposure on the film 22, the wind-up process is performed.

Case No. 4: The Wind-up process

During the time main process is performed, after taking the last exposure on the film 22, in the camera-body-state checking process it is determined at Step 210 that the current frame is the last frame. Therefore, control proceeds from Step 210 to Step 211 wherein it is determined whether the switch SW3 is OFF.

In the case where the wind lever 2 is not operated after the shutter is released, it is determined at Step 211 that the switch SW3 is ON since the switch SW3 has been turned ON by the shutter release. Therefore, control proceeds from Step 211 to Step 212 wherein all the body-state-indicating flags are set to 0. Subsequently control proceeds to Step 213 wherein the wind-up flag is set to 1, and control proceeds to Step 214.

Since the shutter-release permission flag has been set to 0 by the operation at Step 25, it is determined at Step 230 that the shutter-release permission flag is not 1, and because the switch SW1 is OFF, control performs the operations at Steps 232 and 233 to release the lock of the wind lever 2. Subsequently, control returns to the main process.

Thereafter, if controls enters the film-feed-transfer checking process during the time main process is performed, it is determined at Step 103 that the wind-up flag is 1, control proceeds to Step 107 wherein the film-feed-transfer process shown in FIG. 7 is performed. Thereafter it is determined at Step 306 that the wind-up flag is 1. Therefore, control proceeds from Step 306 to Step 313 wherein the wind-up process is performed.

Figure 12:
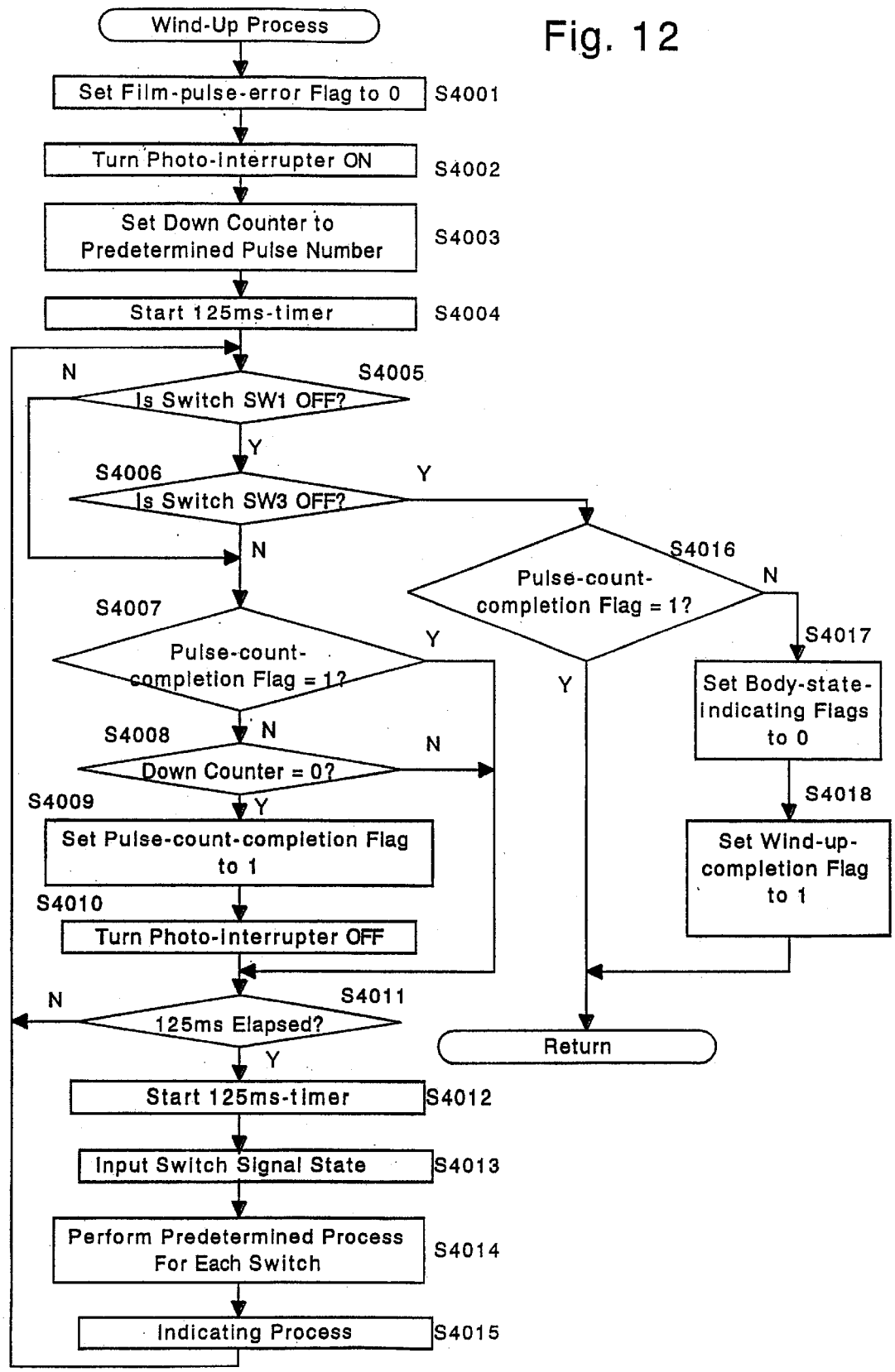
FIG. 12 is a flow chart which illustrates the wind-up process of the manual-wind camera shown in FIG. 1.

In the wind-up process at Step 313, as shown in FIG. 12, firstly the film-pulse-error flag is set to 0 (Step 4001), the photo-interrupter 12a is turned ON (Step 4002), the value of the down counter 23 is set to the predetermined number of pulses which is predetermined to judge if there still remains any frames (Step 4003), the 125 ms-timer is started (Step 4004) and thereafter, it is determined whether the switch SW1 is OFF (Step 4005)

During the time until the wind lever 2 returns to the accommodated position thereof after the wind lever 2 is operated, the switch SW1 remains ON, so that it is determined at Step 4005 that the Switch SW1 is not OFF. Therefore, control proceeds from step 4005 to Step 4007 wherein it is determined whether the pulse-count-completion flag is 1.

Since the pulse-count-completion flag has been set to 0 when control first enters the wind-up process, it is determined at Step 4007 that the pulse-count-completion flag is not 1, so that control proceeds to Step 4008 wherein it is determined whether the down counter 23 is zero. If it is determined at Step 4007 that the pulse-count-completion flag is 1, control skips Steps 4008 through 4010 to proceed to Step 4011. If it is determined at Step 4008 that the down counter 23 is not zero, control skips Steps 4009 and 4010 to proceed to Step 4011. If it is determined at Step 4008 that the down counter 23 is zero, control proceeds to Step 4009 wherein the pulse-count-completion flag is set to 1, and subsequently control proceeds to Step 4010 wherein the photo-interrupter 12a is turned OFF. Thereafter control proceeds to Step 4011.

The operations from Step 4011 to Step 4015 are the same as the operations from Step 3009 to Step 3014, therefore, details of these operations will not be herein discussed.

If the switch SW1 is turned OFF immediately after the wind lever 2 is operated to wind the film, it is determined at Step 4005 that the switch SW1 is OFF. Therefore, control proceeds from Step 4005 to Step 4006 wherein it is determined whether the switch SW3 is OFF. The switch SW3 is OFF because the shutter charge has completed by the operation of the wind lever 2, so that it is determined at Step 4006 that the switch SW3 is OFF. Therefore, control proceeds from Step 4006 to Step 4016 wherein it is determined whether the pulse-count-completion flag is 1.

If it is determined at Step 4016 that the pulse-count-completion flag is 1, control returns to the film-feed-transfer process shown in FIG. 7. If it is determined at Step 4016 that the pulse-count-completion flag is not 1, control proceeds to Step 4017 wherein all the body-state-indicating flags are set to 0, proceeds to Step 4018 wherein the wind-up-completion flag is set to 1, and returns to the film-feed-transfer process shown in FIG. 7.

The reason why it is determined at Step 4016 whether the pulse-count-completion flag is 1 is, firstly, to keep on winding the film because there may be still some further frames remaining, in the case where the predetermined number of pulses (which is predetermined to judge whether any frames still remain) have been counted by turning the wind lever 2 once; and secondly, to perform the idle-winding process discussed later, because the film may be fully rewound if the predetermined number of pulses have not yet been counted by turning the wind lever 2 once.

Since the shutter has been charged by the operation of the wind lever 2, the switch SW3 has been turned OFF and the shutter-release permission flag has been set to 0, if control enters the camera-body-state checking process during the time the main process is performed, the wind-lock-release permission process is performed in Steps 232 and S233 and subsequently control returns to the main process.

Thereafter, if control enters the film-feed-transfer checking process during the time main process is performed, it is determined at Step 104 whether the wind-up-completion flag is 1. If it is determined at Step 104 that wind-up-completion flag is 1, control proceeds to Step 107 wherein the film-feed-transfer process shown in FIG. 7 is performed. Thereafter it is determined at Step 307 that the wind-up-completion flag is 1. Therefore, control proceeds from Step 307 to Step 314 wherein the idle-winding process is performed.

Case No. 5: The Film Indexing Process Without Film Loaded In The Camera

Upon entering the camera-body-state checking process at Step 9 during the time the main process is performed, control proceeds to Step 201 (shown in FIG. 6A) wherein it is determined whether the rear-cover-state detector switch SW is OFF, i.e., whether the rear cover 6 is open. If the rear cover is closed, it is determined at Step 201 that the rear-cover-state detector switch SW is not OFF, so that control proceeds to Step 207 wherein it is determined whether the rear-cover-state detector switch SW was previously OFF (i.e., whether the rear cover 6 was previously open). It is determined at Step 207 that the rear-cover-state detector switch SW was previously OFF, so that control proceeds to Step 208 wherein all the body-state-indicating flags are set to 0. Subsequently control proceeds to Step 209 wherein the currently-indexing flag is set to 1, control proceeds to Step 210.

Thereafter, since the currently-indexing flag has been set to 1 at Step 209, the shutter-release permission flag is set to 0 at Step 228, so that the shutter is prohibited from being released during the film indexing process.

Thereafter, if control enters the film-feed-transfer checking process at Step 8 or step 13 (see FIG. 5) in the main process after control returns to the main process, and if the switch SW1 is turned ON by the operation of the film wind lever 2, it is determined at step 102 that the currently-indexing flag is 1, so that control proceeds to Step 107 wherein the film-feed-transfer process shown in FIG. 7 is performed. Thereafter it is determined at Step 303 (shown in FIG. 7) that the currently-indexing flag is 1, so that control proceeds to Step 310 wherein the film indexing process (shown in FIG. 9) is performed.

The flow of control in the film indexing process (Steps 401 through 424) shown in FIG. 9 has been already discussed above, therefore only the flow of control different from that in the film indexing process will be hereinafter discussed. In the film indexing process, although the film-pulse-count checking process shown in FIG. 10 is performed at Step 409, since no film is herein loaded in the camera, no pulses are generated by the pulse generator 12.

Therefore, the value of the down counter 23 does not become zero, and also the pulse-count-completion flag is not set to 1. Consequently, the clutch-disengaging process is not performed.

Hence, upon the wind lever, 2 returning to the accommodated position, it is determined at Step 415 that the pulse-count-completion flag is not 1, so that control proceeds to Step 416 wherein the currently-winding-film flag is set to 1. Subsequently the value of the down counter 23 is stored once in the memory 24 (Step 417).

Subsequently, control proceeds to Step 418 wherein it is determined whether the lever-turned flag is 1. Since the moment the wind lever 2 is operated (fully turned) for the first time after the rear cover 6 is closed is determined as the moment the first winding operation by the wind lever 2 is performed, the lever-turned flag has been set to 0. Therefore, it is determined at Step 418 that the lever-turned flag is not 1, so that control proceeds from Step 418 to Step 424 wherein the lever-turned flag is set to 1. Subsequently control returns to the film-feed-transfer process. Thereafter, at Step 308 the photo-interrupter 12a is turned OFF and subsequently control returns to the film-feed-transfer checking process, and control returns to the main process. In the case where the wind lever 2 is turned from a rotational position other than the accommodated position thereof, such operation of the wind lever 2 is also regarded as the first winding operation by the wind lever 2.

If control re-enters the film indexing process during the time the main process is performed, it is determined at Step 403 whether the currently-winding-film flag is 1 after the operations at Steps 401 and 402 are performed. Since the currently-winding-film flag has been set to 1 by the first winding operation by the wind lever 2, it is determined at step 403 that the currently-winding-film flag is 1, so that control proceeds to Step 405 wherein the value of the down counter 23 is set to the remaining number of pulses stored in the memory 24.

Subsequently, upon the wind lever 2 returning to the accommodated position thereof during the time the operations from Step 406 through Step 414 are repeatedly performed, control proceeds from Step 408 to Step 415, so that the operation at Step 415 and thereafter are performed. In the operation at Step 415 and thereafter, since the lever-turned flag has been set to 1 at Step 424, it is determined at Step 418 that the lever-turned flag is 1, so that control proceeds from Step 418 to Step 419 wherein it is determined whether the number of pulses generated by the pulse generator 12 is equal to or more than a predetermined number of pulses; i.e., whether the value of the down counter 23 has decreased by the predetermined number of pulses or more than the predetermined number of pulses. Since no film is loaded in the camera, pulses are not generated by the pulse generator 12, so that it is determined at Step 419 that the number of pulses generated by the pulse generator 12 is neither equal to, nor more than, the predetermined number of pulses. Therefore, control proceeds from Step 419 to Step 420 wherein all the body-state-indicating flags are set to 0. Thereafter, control proceeds to Step 421 wherein the no-film flag is set to 1.

Since the currently-indexing flag is set to 0 via the route from Step 419 through Step 421, control exits the film indexing process to allow the shutter to be released by turning the wind lever 2 at least twice if no film is in the camera. The route from Step 419 through Step 421 functions as a detector for determining whether the film is in the camera.

Figure 14A:
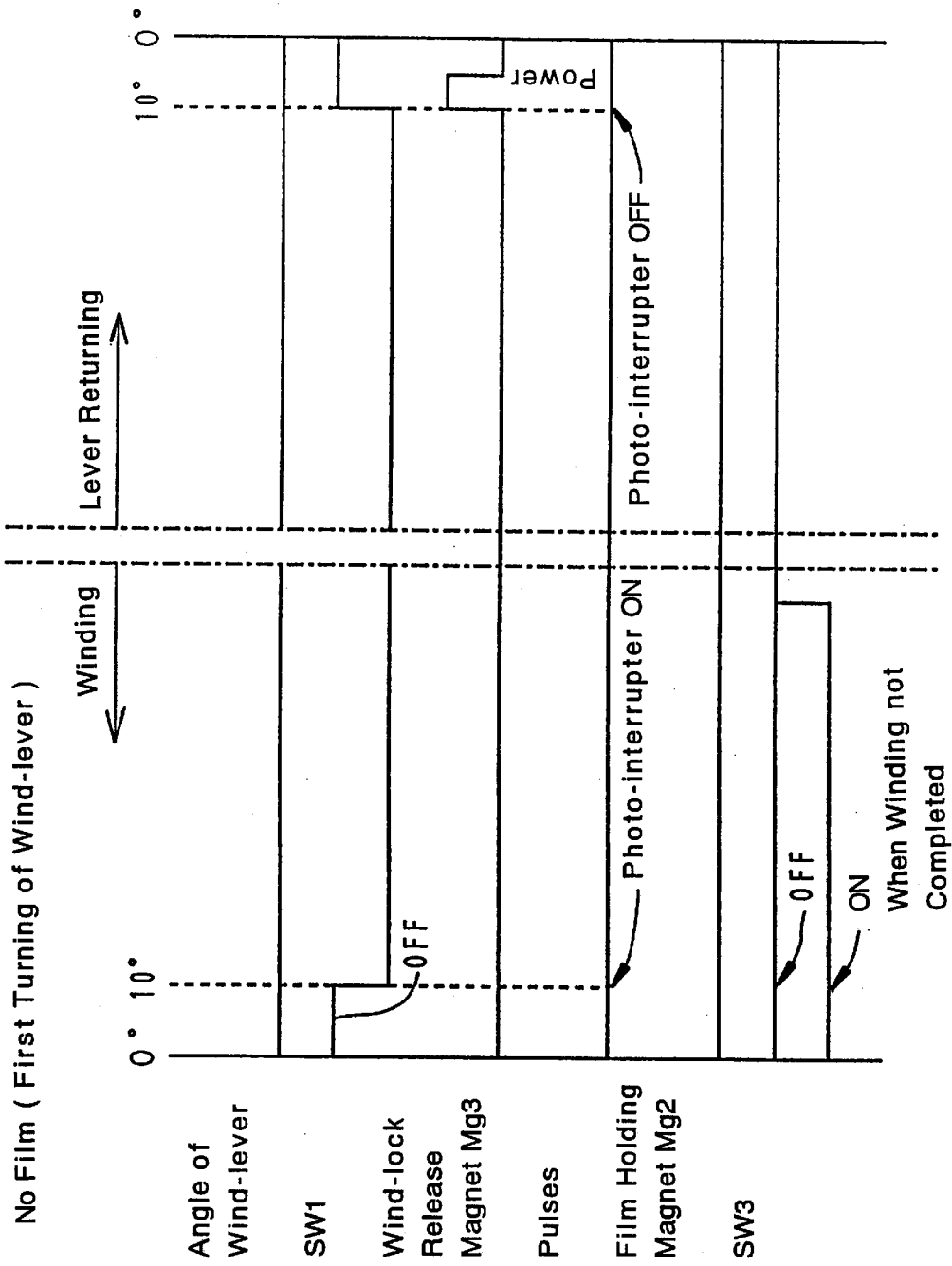
FIG. 14A is a chart for illustrating the sequence of the film indexing process in the case where no film is loaded in the camera, showing a state where pulses are generated by the first winding operation of the wind lever.

Therefore, if no film is in th e camera, no pulses are generated even if the f irst winding operation of the wind lever 2 is performed. Upon the wind lever 2 returning to the accommodated position thereof power is supplied to the wind-lock release magnet Mg3 to release the wind lock, as can be understood from FIG. 14A. As shown in FIG. 14B, the clutch-disengaging process is not performed since no pulses are generated even if the second winding operation of the wind lever 2 is operated. However, the shutter-release permission flag is set to 1 in the main process after control returns to the main process since the switch SW3 is OFF.

If the release switch SW6 is turned ON in the main process after control returns to the main process, it is determined at Step 24 that the release switch SW6 is ON, so that control proceeds to Step 25 wherein the shutter release process is performed and at the same time the shutter-release permission flag is set to 0. Subsequently the operations at and after Step 26 are performed. According to the route from Step 23 to Step 26, the shutter is released to take a picture and the switch SW3 is turned ON.

If control enters the camera-body-state checking process (see FIGS. 6A and 6B) during the time the main process is performed, it is determined at Step 218 that the switch SW3 is ON, so that control proceeds from Step 218 to Step 219. At Step 219 it is determined that the switch SW3 was not previously ON, so that the wind-lock-release permission flag is set to 1 (Step 220) and subsequently proceeds to Step 221.

Since it is determined at Step 221 that the switch SW3 is ON, control skips Steps 222 and 223 to proceed to Step 224, so that the shutter-release-permission flag is not set to 1 at Step 223.

Subsequently, the operations at Step 224 through Step 227 (all being NO) are performed, and subsequently it is determined at Step 229 whether the wind-lock-release permission flag is 1. It is herein determined at Step 229 that the wind-lock-release permission flag is 1, so that control proceeds from Step 229 to Step 230. It is determined at Step 230 that the shutter-release permission flag is not 1, so that control proceeds from Step 230 to Step 231 to perform the operations at Steps 231 through 233 and subsequently control returns to the main process. Due to this control the wind-lock-release permission process is performed, which makes it possible to wind the film by operating the wind lever 2.

If the wind lever 2 is operated during the time the main process is performed, it is determined at Step 106 that the switch SW3 is ON, so that control proceeds Step 107 wherein the film-feed-transfer process shown in FIG. 7 is performed. In the film-feed-transfer process it is determined at Step 304 that the no-film flag is 1, so that the idle-winding process shown in FIG. 8 is performed.

In the idle-winding process shown in FIG. 8, the operation of the photo-interrupter 12a is stopped, which reduces the power consumption. The idle-winding process also functions to stop the operation of the photo-interrupter 12a.

If the shutter is charged by the operation of the wind lever 2, the shutter-release-permission flag is set to 1 again to allow the shutter to be released. If the wind lever 2 is turned at least twice with the rear cover 6 being closed in the case where no film is in the camera, the shutter is allowed to be released.

As can be understood from the foregoing, the camera can determine with software whether film has been loaded without providing the camera with any mechanical film detector used solely for detecting whether film has been loaded.

Furthermore, if the film is not in the camera, the shutter can be released without performing the film holding process, which releases the user from a troublesome operation when a shutter test is performed, while reducing the power consumption of the camera.

Furthermore, the pulse generator is prohibited from operating when the camera has no film therein, which reduces the power consumption of the camera.

Furthermore, when the film is loaded in the camera, the wind lever 2 can continue being turned until the first frame is positioned over the photographic aperture through the film indexing process while the shutter is prohibited from being released, which facilitates ease of operation of the camera. Moreover, when the rear cover 6 is open, the film 22 can be wound while the shutter release is prohibited, and unintentional exposure is prevented when the film 22 is wound out to a corresponding indicia therefor.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A manual-wind camera having a wind lever in which a film having no sprocket holes is loaded, said film being wound on a take-up spool, frame by frame, by manually operating said wind lever, said camera comprising:

a pulse generator which generates pulses in accordance with movement of said film wound by said wind lever; and a control device; wherein said control device determines whether said film is loaded into said camera in accordance with pulses generated by said pulse generator when said wind lever is fully turned from an initial operational position to a maximum operational position thereof.

2. The manual-wind camera according to claim 1, wherein a shutter of said camera is permitted to be released without said take-up spool being locked.

3. The manual-wind camera according to claim 1, wherein said control device prohibits said pulse generator from generating said pulses if said control device determines that said film is not in said camera.

4. The manual-wind camera according to claim 1, wherein said control device prohibits a shutter of said camera from being released until a first frame of said film is positioned over said photographic aperture while allowing said wind lever to continue being turned to wind said film until said first frame of said film is positioned over said photographic aperture.

5. The manual-wind camera according to claim 1, wherein said control device does not detect whether said film is in said camera when said wind lever is operated for the first time after said rear cover is closed.

6. The manual-wind camera according to claim 4, wherein said control device prohibits said shutter of said camera from being released when said rear cover is open, while allowing said wind lever to be rotated.

7. The manual-wind camera according to claim 1, wherein said control device allows said shutter of said camera to be released if said control device detects that no film is loaded into said camera.

8. A manual-wind camera having a wind lever, a film being wound by manually turning said wind lever from an initial operational position to a maximum operational position thereof, said camera comprising:

a pulse generator which generates pulses in accordance with movement of said film wound by said wind lever;

a rear-cover state detector which detects whether a rear cover of said camera is open or closed; and a control device; wherein said control device detects said pulses generated by said pulse generator; and said control device determines whether said film is loaded into said camera in accordance with pulses detected by said control device when said wind lever is fully turned from said initial operational position to said maximum operational position after said rear-cover state detector detects that said rear cover is closed.

9. The manual-wind camera according to claim 8, further comprising a take-up spool on which said film is wound when said wind lever is turned in a direction from said initial operational position to said maximum operational position; and an electromagnetic clutch, which connects said take-up spool with said wind lever when power via the frictional connection of said electromagnetic clutch, is not supplied to said electromagnetic clutch; wherein said electromagnetic clutch disconnects said take-up spool from said wind lever when power is supplied to said electromagnetic clutch.

10. The manual-wind camera according to claim 9, further comprising a film holding device which prohibits said takeup spool from rotating to thereby prohibit said film from being wound on said take-up spool only when power is supplied to said film holding device.

11. The manual-wind camera according to claim 10, wherein said control device supplies power to said electromagnetic clutch to disconnect said take-up spool from said wind lever and at the same time supplies power to said film holding device to prohibit said film from being wound on said take-up spool when a counter value of said counter reaches a predetermined value.

12. The manual-wind camera according to claim 1, wherein said film is Brownie film.

13. A manual-wind camera having a wind lever in which a film having no sprocket holes is loaded, said film being wound on a take-up spool, frame by frame, by manually operating said wind lever, said camera comprising:

a pulse generator which generates pulses in accordance with movement of said film wound by said wind lever;

a rear-cover state detector which detects whether a rear cover of said camera is open or closed; and a control device; wherein upon said rear cover being closed, said control device judges whether said film is loaded into said camera in accordance with pulses generated by said control device when said wind lever is fully rotated from an initial operational position to a maximum operational position.

14. The manual-wind camera according to claim 13, wherein upon said rear cover being closed, said control device judges whether said film is loaded into said camera according to pulses generated after pulses generated after said wind lever is initially rotated to said maximum operational position.

15. A manual-wind camera having a wind lever in which a film having no sprocket holes is loaded, said film being wound on a take-up spool, frame by frame, by manually operating said wind lever, said camera comprising:

a pulse generator which generates pulses in accordance with movement of said film wound by said wind lever;

a rear-cover state detector which detects whether a rear cover of said camera is open or closed; and a control device; wherein upon said rear cover being closed, said control device judges whether said film is loaded into said camera when said wind lever has been fully rotated to a maximum operational position a second time.

* * * * *